US012624249B2

(12) United States Patent (10) Patent No.: US 12,624,249 B2
Verduyn et al. (45) Date of Patent: May 12, 2026

(54) WOOD COATING COMPOSITIONS

(71) Applicant: MUYLLE-FACON, Izegem (BE)

(72) Inventors: Arne Verduyn, Moorsele (BE); Elke De Meyer, Heule (BE); Jan Torfs, Beerse (BE); Sam Van Der Heijden, Sint-Niklaas (BE)

(73) Assignee: MUYLLE-FACON, Izegem (BE)

( * ) Notice: Subject to any disclaimer, the term of this patent is extended or adjusted under 35 U.S.C. 154(b) by 529 days.

(21) Appl. No.: 18/258,185

(22) PCT Filed: Dec. 22, 2021

(86) PCT No.: PCT/EP2021/087384
§ 371 (c)(1),
(2) Date: Jun. 16, 2023

(87) PCT Pub. No.: WO2022/136591
PCT Pub. Date: Jun. 30, 2022

(65) Prior Publication Data

US 2025/0277133 A1 Sep. 4, 2025

(30) Foreign Application Priority Data

Dec. 23, 2020 (EP) ..................................... 20217130
Jul. 30, 2021 (BE) ................................... 2021/5606

(51) Int. Cl.
| | |
|---|---|
| *C09D 191/00* | (2006.01) |
| *B05D 1/28* | (2006.01) |
| *B05D 7/06* | (2006.01) |
| *C08K 3/22* | (2006.01) |
| *C08K 5/098* | (2006.01) |
| *C08L 91/00* | (2006.01) |
| *C09D 7/61* | (2018.01) |
| *C09D 7/63* | (2018.01) |
| *C09D 7/80* | (2018.01) |
| *C09D 167/08* | (2006.01) |

(52) U.S. Cl.
CPC ........... *C09D 191/005* (2013.01); *B05D 1/28* (2013.01); *B05D 7/06* (2013.01); *C08K 3/22* (2013.01); *C08K 5/098* (2013.01); *C08L 91/005* (2013.01); *C09D 7/61* (2018.01); *C09D 7/63* (2018.01); *C09D 7/80* (2018.01); *C09D 167/08* (2013.01); *C09D 191/00* (2013.01); *B05D 2203/20* (2013.01); *C08K 2003/2241* (2013.01)

(58) Field of Classification Search
CPC ........... B05D 2203/20; B05D 2506/15; B05D 2501/10; B05D 7/06; C09D 167/08; C09D 7/61; C09D 7/63; C09D 7/80; C08L 2205/025; C08L 91/005; C08L 91/06
See application file for complete search history.

(56) References Cited

U.S. PATENT DOCUMENTS

| | | | |
|---|---|---|---|
| 4,857,578 A * | 8/1989 | Hall ..................... | C09D 167/08 106/245 |
| 2003/0154885 A1 | 8/2003 | Krendlinger et al. | |
| 2007/0037001 A1 | 2/2007 | Gao et al. | |

FOREIGN PATENT DOCUMENTS

| | | |
|---|---|---|
| CN | 110330892 A | 10/2019 |
| EP | 1 217 051 A2 | 6/2002 |

OTHER PUBLICATIONS

International Search Report and Written Opinion for corresponding PCT Application No. PCT/EP2021/087384, mailed May 6, 2022 (12 sheets).
International Preliminary Report on Patentability for corresponding PCT Application No. PCT/EP2021/087384, completed Nov. 30, 2022 (24 sheets).
DuPont Teflon PTFE 7C fluoropolymer resin Product Information Data Sheet, Jun. 1999 Retrieved from https://www.professionalplastics.com/professionalplastics/Teflon7C_DataSheet.pdf (4 sheets).
Carnauba wax, Wikipedia, Apr. 27, 2015, Retrieved from https://en.wikipedia.org/wiki/Carnauba_wax (3 sheets).
Japan wax, Wikipedia, Nov. 30, 2020, Retrieved from https://en.wikipedia.org/wiki/Japan_wax (1 sheet).
Candelilla wax, Wikipedia, Jun. 25, 2020, Retrieved from https://en.wikipedia.org/wiki/Candelilla_wax (2 sheets).

* cited by examiner

*Primary Examiner* — Christopher M Rodd
(74) *Attorney, Agent, or Firm* — Womble Bond Dickinson (US) LLP

(57) ABSTRACT

The present invention relates to an improved wood coating composition wherein said composition (C) comprises, relative to the total weight of composition (C), from 58.00 to 95.00 weight percentage of at least one alkyd resin or at least one drying oil, from 0.10 to 8.00 wt. % of at least one microcrystalline wax having a congealing point from 60° C. to 100° C., and from 5.00 to 34.00 wt. % of at least one synthetic micronized wax, said at least one synthetic micronized wax having a particle size $D_{90}$ equal to or less than 36.0 μm and a particle size $D_{50}$ equal to or less than 20.0 μm, wherein the congealing point of the microcrystalline wax ($W_c$) is measured according to the standard ASTM D938, and wherein the particle size of the at least one micronized wax ($M_p$) is measured according to the standard DIN ISO 13320.

21 Claims, 2 Drawing Sheets

Figure 4:
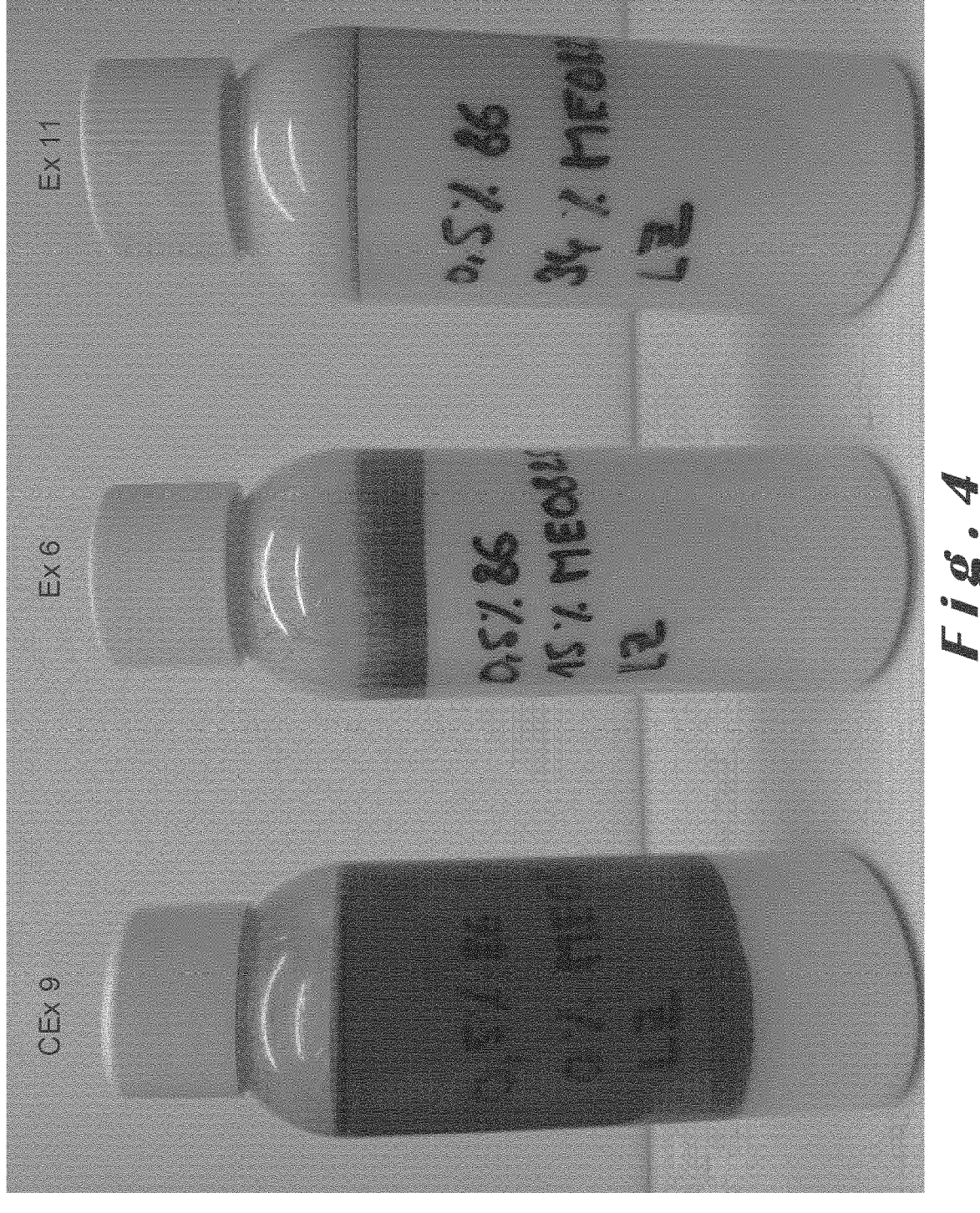

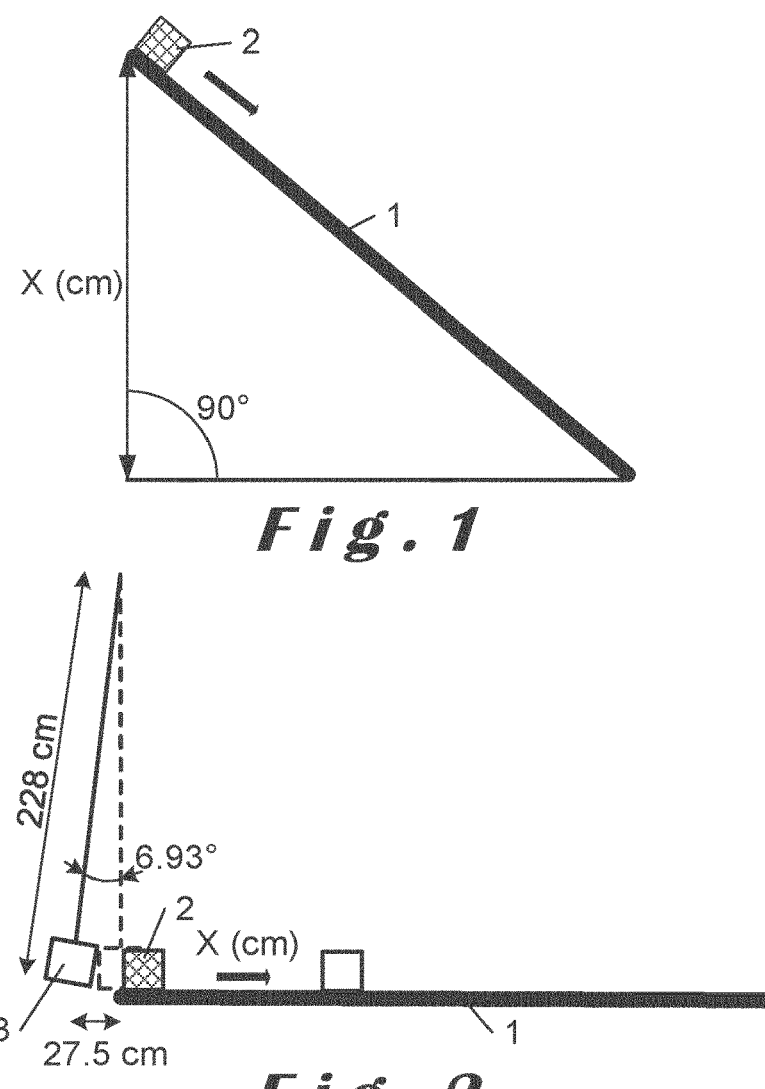
*Fig.1*
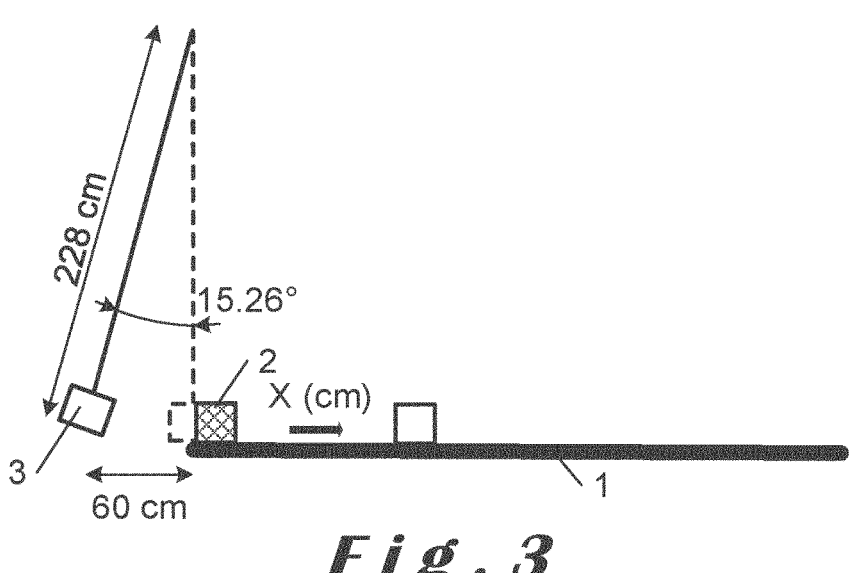
*Fig.2*
*Fig.3*

WOOD COATING COMPOSITIONS

CROSS-REFERENCE TO RELATED APPLICATIONS

This application is a U.S. National Phase Patent Application and claims priority to and the benefit of International Patent Application No. PCT/EP2021/087384, filed on Dec. 22, 2021, which claims priority to Belgian Patent Application No. 2021/5606, filed on Jul. 30, 2021, and European Patent Application No. 20217130.2, filed on Dec. 23, 2020. The entire contents of each of which are incorporated herein by reference.

FIELD OF THE INVENTION

The present invention relates to wood coating compositions for the preservation and the protection of wood products, said wood coating compositions providing a high stability against phase separation, and an excellent spreadability, while maintaining good hardness, abrasion resistance, scratch resistance, matting, antiblocking, water repellency, and slip resistance properties. The invention further relates to methods for manufacturing of the same, to methods for treating wood products wherein said wood products are treated with the wood coating compositions, and to coated layers obtained by said methods for treating wood products wherein said wood products are treated with the wood coating compositions.

BACKGROUND OF THE INVENTION

Wood, as a natural hybrid composite material made of biopolymers such as cellulose, lignin and hemicelluloses, represents a versatile and widely exploited renewable resource for indoor and outdoor applications such as building, construction, and living. It has been used by mankind since thousands of years. Even today wooden furniture, floorings and articles of daily use experience great popularity. Wood provides high versatility and stability in combination with excellent workability, but, on the other hand, wood is sensitive to external influences such as abrasion, humidity, temperature variations, or germs. For instance, solid hardwood flooring and engineered wood flooring have long been a highly desirable house feature in the sense of warmth, tradition, and durability. However, hardwood floors are particularly prone to damage from accumulated foot traffic, wear and tear, and moisture. Therefore, for many years, wood coating compositions are applied to hardwood floors in order to preserve and protect the wood from deterioration, scratches, spills and stains, moisture, and the wear and tear caused by foot traffic, while maximizing, when desired, the appearance of the hardwood floors. Nowadays, many different wood coating compositions for solid hardwood floorings and engineered wood floorings exist, each of those wood coating compositions thereby demonstrating one or more of the properties such as water repellency, abrasion resistance, scratch resistance, matting, antiblocking, and slip resistance. Whereupon each wood coating has to meet individual requirements depending on the use of the wood product. This confronts wood coating formulators consistently with new challenges.

Examples of coating compositions for coating materials are for instance described in US 2003/0154885 A1. US 2003/0154885 A1 generally describes the use of mixtures of waxes for coatings. These wax mixtures comprise homopolymers or copolymers of $C_2$-$C_{18}$ α-olefins, and at least another wax which can be selected from a large variety of waxes such as polyethylene waxes, polytetrafluoroethylene waxes, polypropylene waxes, amide waxes, Fischer-Tropsch paraffines, montan waxes, natural waxes, macrocrystalline paraffines and microcrystalline waxes, and the like. The wax mixtures are preferably used in micronized form as illustrated in the working examples ($D_{50}$=8 μm) in which 2% by weight of some micronized wax mixtures were incorporated into an alkyd resin varnish with the aid of a dissolver for the purpose of assessing the blocking properties and the feel.

US 2007/0037001 A1 discloses oil/wax coating compositions which provide good water resistance and dimensional stability to wood and wood products. The oil component may be drying oils, non-drying oils, low boiling oils, and high boiling oils. In the working examples use is made of linseed oil alone or in combination with mineral oil. A large variety of waxes are mentioned to be suitable for use. In the working examples only a paraffin wax was used. It is known that wax is widely used to provide water repellency and dimensional stability to wood and wood products. US 2007/0037001 A1, demonstrates that both water repellency and dimensional stability of wood improve upon treatment with these oil/wax coating compositions.

EP 1217051 A2 describes surface treating agents for ligneous floorings that render the surface of treated floors resistant to slipping, thereby preventing tumbling. The surface treating agents contain 75-90% by weight of a plant drying oil, such as for instance linseed oil or tung oil, and 1-5% by weight of a natural and powdered carnauba wax having an average particle size equal to or less than 300 μm, for instance an average particle size of 100 μm in the working examples, for achieving a certain degree of slip resistance. Further, the surface treating agents contain a natural Japan wax and a natural candelilla wax to adjust the viscosity of the surface treating agents on the one hand and the brightness and the moisture resistance of the coating after treatment of ligneous floorings with the surface treating agents on the other hand.

CN 110330892 A describes aqueous wood wax oils comprising (modified) vegetable drying oils such as for instance linseed oil, tung oil or soybean oil, an alkyd resin, a natural carnauba wax/candelilla wax/or beeswax, and a microcrystalline wax. In particular, the described aqueous wood wax oils are prepared by melting and mixing all the various components at high temperatures, i.e. temperatures above the melting point of the various components such as temperatures up to 180-200° C. Further, these aqueous wood wax oils give rise to good weather resistance of the wood (e.g. when subjected to high and low temperatures, resistance to water and moisture, etc.) after treatment thereof with said aqueous wood wax oils.

U.S. Pat. No. 4,857,578 A describes protective water repellent wood coating compositions for wood substrates to prevent delamination of successive coating layers while providing intercoat adhesion and water repellency. These protective coating compositions are uniformly dispersed mixtures composed of an alkyd resin as major compound, micronized polytetrafluoroethylene (PTFE), and waxes chosen among a Fischer-Tropsch wax, a polyethylene wax, or a polypropylene wax, and an organic solvent. The role of the organic solvent is to solubilize the alkyd resin and to provide the medium for the dispersion of the PTFE and the microcrystalline wax. Mention is made of organic solvents such as mineral spirits, naphtha, mixed xylenes, toluene and the like. The drawback of these compositions is the presence of high amounts of this organic solvent. Such organic solvents are nowadays subject to strict EPA regulations. The coatings as disclosed in U.S. Pat. No. 4,857,578 A can have a thickness in the range from about 1 dry mil (i.e. 25.4 micron) to about 5 dry mils (i.e. 127 micron) while maintaining the benefits of improved water repellency and though nonwettability.

In view of all the above, there remains a continuous need for improved wood coating compositions for the preservation and the protection of wood products, said improved coating compositions having a high stability against phase separation, and an excellent spreadability, thereby allowing the respective coating compositions to be used in low amounts resulting in thin coating layers upon application to wood products, while maintaining good hardness, abrasion resistance, scratch resistance, matting, antiblocking, water repellency, and slip resistance properties.

SUMMARY OF THE INVENTION

The inventors have now surprisingly found that it is possible to provide an improved wood coating composition fulfilling the above-mentioned needs.

Thus, there is now provided a wood coating composition [composition (C), herein after] comprising, relative to the total weight of the composition (C):

from 58.00 to 95.00 weight percentage [wt. %, herein after] of at least one alkyd resin or at least one drying oil;

from 0.10 to 8.00 wt. % of at least one microcrystalline wax having a congealing point from 60° C. to 100° C. [microcrystalline wax ($W_c$), herein after];

from 5.00 to 34.00 wt. % of at least one synthetic micronized wax selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one synthetic micronized wax having a particle size $D_{90}$ equal to or less than 36.0 μm and a particle size $D_{50}$ equal to or less than 20.0 μm [micronized wax ($M_p$), herein after];

wherein the congealing point of the microcrystalline wax ($W_c$) is measured according to the standard ASTM D938, and wherein the particle size of the micronized wax ($M_p$) is measured according to the standard DIN ISO 13320.

In another aspect, the present invention further provides a method for the manufacturing of the composition (C), as detailed above.

In another aspect, the present invention further provides a method for the treatment of a surface or at least part of a surface of a wood product wherein said wood product is treated with the composition (C), as detailed above.

In another aspect, the present invention further provides a coated layer obtained by the method for the treatment of the surface or at least part of the surface of the wood product wherein said wood product is treated with the composition (C), as detailed above.

DETAILED DESCRIPTION

Composition (C)

Within the context of the present invention, the term "comprising" should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a composition comprising components A and B" should not be limited to compositions consisting only of components A and B. It means that with respect to the present invention, the only relevant components of the composition are A and B. Accordingly, the terms "comprising" and "including" encompass the more restrictive terms "consisting essentially of" and "consisting of".

As used herein, the terms "optional" or "optionally" means that a subsequently described event or circumstance can or cannot occur, and that the description includes instances where said event or circumstance occurs and instances where it does not.

The inventors have surprisingly found that by using at least one alkyd resin or at least one drying oil, as detailed above, in combination with at least one microcrystalline wax ($W_c$), as detailed above, and at least one micronized wax ($M_p$), as detailed above, the resulting composition (C), as detailed above, yields a high stability against phase separation, and an excellent spreadability, thereby allowing the composition (C) to be used in low amounts resulting in thin coating layers upon application to wood products, as demonstrated in the working examples, while maintaining good hardness, abrasion resistance, scratch resistance, matting, antiblocking, water repellency, and slip resistance properties.

Within the context of the present invention, the expressions "at least one alkyd resin or at least one drying oil", "at least one microcrystalline wax ($W_c$)", and "at least one micronized wax ($M_p$)" are intended to denote one or more than one alkyd resin or one or more than one drying oil, one or more than one microcrystalline wax ($W_c$), and one or more than one micronized wax ($M_p$), respectively. Mixtures of alkyd resins or mixtures of drying oils, mixtures of microcrystalline waxes ($W_c$), and mixtures of micronized waxes ($M_p$) can also be used for the purpose of the invention, respectively.

In the rest of the text, the expressions "alkyd resin", "drying oil", "microcrystalline wax ($W_c$)", "and "micronized wax ($M_p$)" are understood, for the purposes of the present invention, both in the plural and the singular form, that is to say the composition (C) of the present invention may comprise one or more than one alkyd resin or one or more than one drying oil, one or more than one microcrystalline wax ($W_c$), and one or more than one micronized wax ($M_p$), respectively.

Within the context of the present invention, the expression "from 58.00 to 95.00 weight percentage [wt. %, herein after] of at least one alkyd resin or at least one drying oil" refers either to the amount of alkyd resin or to the amount of drying oil, when the composition (C) contains only one alkyd resin or only one drying oil, or to the sum of the amounts of alkyd resin or to the sum of the amounts of drying oil, when the composition (C) contains more than one alkyd resin or more than one drying oil. This being said, it means that it is necessary that, when more than one alkyd resin or more than one drying oil is present, then it is the sum of the amounts of each of said alkyd resin or each of said drying oil that ranges from 58.00 to 95.00 wt. %, relative to the total weight of the composition (C).

Within the context of the present invention, the term "alkyd resin" is intended to denote thermosetting polymers, chemically similar to polyester resins, obtained by subjecting a raw material composition comprising at least one polycarboxylic acid component, or the corresponding anhydrides of said at least one polycarboxylic acid component where they exist, [component (A), herein after], at least one polyalcohol component [component (B), herein after], and at least one monocarboxylic acid component, or the corresponding triglyceride of said at least one monocarboxylic acid component, [component (D), herein after] to one or more esterification and/or transesterification reactions.

The classification of alkyd resins is based on the nature of the component (D). Alkyd resins can be broadly classified into drying and non-drying types depending on the ability of their films to dry by air oxidation, i.e. autoxidative drying. This drying ability is derived from polyunsaturated components (D) in the alkyd resin composition. If drying oils, such as tung oil, or fatty acids thereof, are the sources of the component (D) for the alkyd resin, said alkyd resin belongs to the drying type. On the other hand, if non-drying oils, such as coconut oil, or fatty acids thereof, are the sources of the component (D) for the alkyd resin, said alkyd resin belongs to the non-drying type. The choice of the fatty acid residues further determines whether the alkyd resin is described as a long oil, medium oil, or short oil alkyd resin. For an alkyd resin, the oil length is defined as the wt. % of oil or triglyceride equivalent, or alternatively, as the wt. % of fatty acids in the finished resin. Alkyd resins are generally classified into four classes by oil length: very long over 70%, long 56-70%, medium 46-55%, and short below 45%.

Preferably, the alkyd resin is a drying alkyd resin. Drying alkyd resins suitable for use in the composition (C) of the present invention are those known to the skilled in the art. In particular, drying alkyd resins are polyesters which have been modified by addition of unsaturated fatty acids or the corresponding triglycerides thereof, said unsaturated fatty acids or the corresponding triglycerides thereof preferably being from plant or vegetable oils.

As used herein, the component (A) for preparing the drying alkyd resin, as detailed above, refers to a carboxylic acid having two or more carboxylic acid functional groups, such as ortho-phthalic acid or anhydride, isophthalic acid, terephthalic acid, 1,2-cyclohexanedicarboxylic acid or anhydride, 1,4-cyclohexanedicarboxylic acid, tetrahydrophthalic acid or anhydride, maleic anhydride, fumaric anhydride, adipic acid, azelaic acid, succinic acid or anhydride, sebacic acid, trimelletic acid or anhydride, itaconic acid, citraconic acid, pyromelletic acid or anhydride, or polymers or mixtures of two or more thereof. Preferably, the component (A), as detailed above, is selected from ortho-phthalic anhydride, isophthalic acid, 1,2-cyclohexanedicarboxylic anhydride, or mixtures of two or more thereof.

As used herein, the component (B) for preparing the drying alkyd resin, as detailed above, refers to an alcohol having two or more alcohol (i.e. hydroxyl) functional groups such as glycerol, diglycerol, glycol, sugar, sugar alcohol, and combinations thereof. Non-limiting examples of glycols include ethylene glycol, diethylene glycol, 1,2-propanediol, 1,3-propanediol, 1,4-butylene glycol, 1,3-butylene glycol, 2,3-butylene glycol, neopentyl glycol, 2-butyl-2-ethyl-1,3-propanediol, dipropylene glycol, hexane triol, dimethylolpentane, dimethylolethane, trimethylolethane, trimethylolpropane, trimethylolbutane, di-trimethylolethane, di-trimethylolpropane, di-trimethylolbutane, or polymers or mixtures of two or more thereof. Non-limiting examples of sugars include glucose, sucrose, fructose, raffinose, maltodextrose, galactose, xylose, maltose, lactose, sorbitol, mannose, erythrose, pentaerythritol, dipentaerythritol, tripentaerythritol, or mixtures of two or more thereof. Non-limiting examples of sugar alcohols include erythritol, xylitol, malitol, mannitol, sorbitol, or mixtures of two or more thereof. Preferably, the component (B), as detailed above, is selected from glycerol, diglycerol, trimethylolpropane, pentaerythritol, or mixtures of two or more thereof.

As used herein, the component (D) for preparing the drying alkyd resin, as detailed above, refers to a monocarboxylic acid, or the corresponding triglyceride thereof, such as linseed fatty acid or linseed oil, sunflower fatty acid or sunflower oil, tung oil, safflower fatty acid or safflower oil, soybean fatty acid or soybean oil, poppy seed oil, tall oil, peanut oil, (dehydrated) castor fatty acid or (dehydrated) castor oil, corn oil, rapeseed oil, sesame seed oil, rice germ oil, cottonseed fatty acid or cottonseed oil, fish oil, herring oil, grape seed oil, flaxseed oil, chia oil, oiticica oil, menhaden oil, walnut oil, camelina oil, hemp seed oil, perilla oil, linoleic acid, α-linolenic acid, oleic acid, α-eleostearic acid, myristoleic acid, lauroleic acid, palmitoleic acid, or mixtures of two or more thereof. Preferably, the component (D), as detailed above, is selected from linseed oil, tung oil, perilla oil, poppy seed oil, tall oil, walnut oil, soybean oil, sunflower oil, safflower oil, flaxseed oil, grape seed oil, oiticica oil, cottonseed oil, fish oil, sesame seed oil, rice germ oil, camelina oil, rapeseed oil, corn oil, hemp seed oil, herring oil, chia oil, peanut oil, (dehydrated) castor oil, or mixtures of two or more thereof. The drying ability of the drying alkyd resin as used in the present invention is mainly derived from the presence of the component (D) in the alkyd resin composition.

According to the present invention, various proportions of the component (A), the component (B), and the component (D) may be used to obtain the drying alkyd resins having the desired drying properties.

The alkyd resin of the present invention may be commercially available or may be chemically synthesized. Said synthesis of the alkyd resin may be carried out using conventional methods known to the skilled in the art.

It is further understood that all definitions and preferences as described for the at least one alkyd resin above equally apply for this embodiment and all further embodiments, as described below.

Within the context of the present invention, the term "drying oil" is understood to refer to unsaturated fatty oils that are liquid oils that crosslink and solidify by reaction with atmospheric oxygen.

As an alternative to the use of drying alkyd resins, as detailed above, in the composition (C) of the present invention, drying oils alone can also be used.

As non-limiting examples of suitable drying oils to be used in the composition (C) of the present invention mention may be made of linseed oil, sunflower oil, tung oil, safflower oil, soybean oil, poppy seed oil, tall oil, peanut oil, (dehydrated) castor oil, corn oil, rapeseed oil, sesame seed oil, rice germ oil, cottonseed oil, fish oil, herring oil, grape seed oil, flaxseed oil, chia oil, oiticica oil, menhaden oil, walnut oil, camelina oil, hemp seed oil, perilla oil, or mixtures of two or more thereof.

Preferred drying oils are chosen among linseed oil, sunflower oil, tung oil, safflower oil, soybean oil, poppy seed oil, tall oil, peanut oil, (dehydrated) castor oil, corn oil, rapeseed oil, sesame seed oil, rice germ oil, cottonseed oil, fish oil, herring oil, grape seed oil, flaxseed oil, chia oil, oiticica oil, walnut oil, camelina oil, hemp seed oil, or perilla oil.

More preferred drying oils are chosen among linseed oil, sunflower oil, tung oil, soybean oil, poppy seed oil, tall oil, walnut oil, hemp seed oil, or perilla oil. These more preferred drying oils are particularly characterized by having an iodine value of at least 100 (expressed as grams (g) iodine per 100 grams specimen), preferably at least 110, more preferably at least 120. The iodine value is often given without units as a dimensionless value, and is preferably determined according to standard ISO 3961-1989. The inventors have found that for all of these more preferred drying oils [drying oil of class (I), herein after] good results can be obtained in terms of assuring optimal drying properties, i.e. optimal crosslinking propensities thereby leading to excellent curing speeds, upon application of the composition (C) to wood products.

It is further understood that all definitions and preferences as described above for the at least one drying oil equally apply for this embodiment and all further embodiments, as described below.

As said above, the amount of the at least one alkyd resin or the at least one drying oil, as detailed above, is from 58.00 to 95.00 wt. %, relative to the total weight of the composition (C).

The inventors have surprisingly found that the alkyd resin or the drying oil can now be used in high amounts, relative to the total weight of the composition (C), thereby especially assuring optimal drying properties upon application of said composition (C) to wood products while maintaining excellent binder properties and good dispersibility of the microcrystalline wax ($W_c$), and the micronized wax ($M_p$) in said alkyd resin or drying oil. Furthermore, there is no need any more for organic solvents to solubilize the alkyd resin or the drying oil and to provide the medium for the dispersion of the microcrystalline wax ($W_c$), and the micronized wax ($M_p$).

Advantageously, the amount of the alkyd resin or the drying oil, as detailed above, relative to the total weight of the composition (C), is equal to or greater than 60.00 wt. %, preferably equal to or greater than 65.00 wt. %, more preferably equal to or greater than 70.00 wt. %.

It is further understood that the upper limit of the amount of the alkyd resin or the drying oil, as detailed above, relative to the total weight of the composition (C), is equal to or less than 93.50 wt. %, preferably equal to or less than 92.00 wt. %, more preferably equal to or less than 90.00 wt. %.

In a preferred embodiment of the composition (C) of the present invention, the alkyd resin or the drying oil, as detailed above, relative to the total weight of the composition (C), is present in an amount from 60.00 to 93.50 wt. %, preferably in an amount from 65.00 to 92.00 wt. %, more preferably in an amount from 70.00 to 90.00 wt. %.

As said above, the composition (C) of the present invention, relative to the total weight of the composition (C), further comprises from 0.10 to 8.00 wt. % of at least one microcrystalline wax having a congealing point from 60° C. to 100° C. [microcrystalline wax ($W_c$), herein after].

The inventors have surprisingly found that by choosing specific microcrystalline waxes ($W_c$), the high shear viscosity of the composition (C) of the present invention can be kept lower thereby leading to an excellent spreadability of the composition (C) upon application to wood products. Furthermore, the high shear viscosity of the composition (C) is also less prone to variations when subjected to variable thermal conditions, resulting in improved storage and transport properties of the composition (C) at extreme thermal conditions. In other words, the composition (C) is characterized by having a higher thermal stability. This also results in a more uniform and more constant spreadability of the composition (C), regardless of temperature, upon application of said composition (C) to wood products. Furthermore, the presence of the microcrystalline wax ($W_c$) leads to a higher low shear viscosity thereby ensuring the stability of the composition (C) against phase separation over time.

Within the context of the present invention, the term "microcrystalline wax ($W_c$)" is intended to denote a specific type of wax that is derived from de-oiling petrolatum during the refining process of crude petroleum. Microcrystalline wax ($W_c$) contains a high percentage of saturated isoparaffinic (branched) hydrocarbons, i.e. isoparaffins, and naphthenic hydrocarbons when compared to paraffin wax, which mainly contains unbranched alkanes. Furthermore, when compared to paraffin wax, the hydrocarbon chains in microcrystalline waxes ($W_c$) are longer than these of refined paraffin waxes, and thus the corresponding molecular weights of microcrystalline waxes ($W_c$) are higher than the molecular weights of paraffin waxes. Further, microcrystalline waxes ($W_c$) are particularly characterized by the fineness of its (colloidal micro) crystals in contrast to the larger (macro) crystals of more crystalline paraffin wax. In general, the crystal structure of the microcrystalline wax ($W_c$) is small and thin, making the microcrystalline wax ($W_c$) crystals relatively more flexible than paraffin wax crystals.

As said above, the at least one microcrystalline wax ($W_c$), as detailed above, has a congealing point from 60° C. to 100° C.

Advantageously, the congealing point of the microcrystalline wax ($W_c$), as detailed above, is equal to or greater than 65° C., preferably equal to or greater than 70° C., more preferably equal to or greater than 75° C., more preferably equal to or greater than 80° C.

It is further understood that the upper limit of the congealing point of the microcrystalline wax ($W_c$), as detailed above, is equal to or less than 97° C., preferably equal to or less than 94° C., more preferably equal to or less than 92° C., more preferably equal to or less than 90° C.

In a preferred embodiment of the composition (C), the microcrystalline wax ($W_c$), as detailed above, has a congealing point from 65° C. to 97° C., preferably from 70° C. to 94° C., more preferably from 75° C. to 92° C., more preferably from 80° C. to 90° C.

According to the present invention, the congealing point of the microcrystalline wax ($W_c$) is measured according to ASTM D938, and is best interpreted as the "solidification point". The congealing point is a property which differs from the "melting point", which is preferably measured according to ASTM D127 "Drop melting point of petroleum wax including petrolatum". For some substances, the congealing point lies close to the higher melting point, but for other substances, in particular mixtures, the congealing point may sometimes be up to 10° C. lower than the melting point.

It is further understood that mixtures of microcrystalline waxes may be used in the composition (C) of the present invention. In this case, when mixtures of microcrystalline waxes are used in the composition (C), as detailed above, the congealing point of the at least one microcrystalline wax, as detailed above, is the congealing point of the mixture of microcrystalline waxes.

In one embodiment of the composition (C) according to the present invention, the microcrystalline wax ($W_c$), as detailed above, has a needle penetration value P of equal to or less than 90.0 dmm (0.1 mm), preferably equal to or less than 75.0 dmm, more preferably equal to or less than 50.0 dmm, more preferably equal to or less than 35.0 dmm, more preferably equal to or less than 25.0 dmm, more preferably equal to or less than 20.0 dmm.

It is further understood that the lower limit of the needle penetration value P of the microcrystalline wax ($W_c$), as detailed above, is not particularly limited but advantageously equal to or greater than 5.0 dmm, preferably equal to or greater than 7.0 dmm, more preferably equal to or greater than 9.0 dmm.

According to the present invention, the needle penetration value P of the microcrystalline wax ($W_c$), as detailed above, is measured according to ASTM D1321 at 25° C.

It is further understood that mixtures of microcrystalline waxes ($W_c$) may be used in the composition (C) of the present invention. In this case, when mixtures of microcrystalline waxes ($W_c$) are used in the composition (C), as detailed above, the needle penetration value P of the microcrystalline wax ($W_c$), as detailed above, is the needle penetration value P of the mixture of microcrystalline waxes ($W_c$).

It is further understood that all definitions and preferences as described for the microcrystalline wax ($W_c$) above equally apply for this embodiment and all further embodiments, as described below.

As said above, the amount of the microcrystalline wax ($W_c$), as detailed above, is from 0.10 to 8.00 wt. %, relative to the total weight of the composition (C).

Within the context of the present invention, the expression "from 0.10 to 8.00 wt. % of at least one microcrystalline wax ($W_c$)" refers either to the amount of microcrystalline wax ($W_c$), when the composition (C) contains only one microcrystalline wax ($W_c$), or to the sum of the amounts of microcrystalline wax ($W_c$), when the composition (C) contains more than one microcrystalline wax ($W_c$). This being said, it means that it is necessary that, when more than one microcrystalline wax ($W_c$) is present, then it is the sum of the amounts of each of said microcrystalline wax ($W_c$) that ranges from 0.10 to 8.00 wt. %, relative to the total weight of the composition (C).

Advantageously, the amount of the microcrystalline wax ($W_c$), as detailed above, relative to the total weight of the composition (C), is equal to or greater than 0.15 wt. %, preferably equal to or greater than 0.20 wt. %, more preferably equal to or greater than 0.25 wt. %.

It is further understood that the upper limit of the amount of the microcrystalline wax ($W_c$), as detailed above, relative to the total weight of the composition (C), is equal to or less than 6.00 wt. %, preferably equal to or less than 5.00 wt. %, more preferably equal to or less than 4.00 wt. %, more preferably equal to or less than 3.00 wt. %, more preferably equal to or less than 2.00 wt. %.

In a preferred embodiment of the composition (C) of the present invention, the microcrystalline wax ($W_c$), as detailed above, relative to the total weight of the composition (C), is present in an amount from 0.15 to 6.00 wt. %, preferably in an amount from 0.15 to 5.00 wt. %, more preferably in an amount from 0.20 to 4.00 wt. %, more preferably in an amount from 0.20 to 3.00 wt. %, more preferably in an amount from 0.25 to 2.00 wt. %.

As said above, relative to the total weight of the composition (C), the composition (C) comprises from 5.00 to 34.00 wt. % of at least one synthetic micronized wax selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one synthetic micronized wax having a particle size $D_{90}$ equal to or less than 36 μm and a particle size $D_{50}$ equal to or less than 20 μm [micronized wax ($M_p$), herein after].

The use and presence of synthetic micronized waxes ($M_p$) has a decisive influence with regards to the resulting composition (C) according to the present invention having good abrasion resistance, scratch resistance, matting, antiblocking, water repellency, and slip resistance properties. Furthermore, the inventors have surprisingly found that by using a synthetic micronized wax having a specific particle size $D_{90}$ equal to or less than 36.0 μm and a particle size $D_{50}$ equal to or less than 20.0 μm, the resulting composition (C) yields an excellent spreadability upon its application to wood products. Without being bound to this theory, the inventors believe that by using a micronized wax having a specific particle size $D_{90}$ equal to or less than 36.0 μm and a particle size $D_{50}$ equal to or less than 20.0 μm in the composition (C), as detailed above, the resulting composition (C) demonstrates an improved spreadability since the micronized wax particles as comprised therein may be more in proportion to the average thickness of the coating layer upon application of the composition (C) to wood products, and furthermore said micronized wax particles may be more suitable to partly enter the pores on the surface of the wood products thereby leading to optimal resistance properties while applying the composition (C) to said wood products.

Advantageously, the micronized wax ($M_p$), as detailed above, has a particle size $D_{90}$ equal to or less than 32.0 μm and a particle size $D_{50}$ equal to or less than 18.0 μm, preferably a particle size $D_{90}$ equal to or less than 29.0 μm and a particle size $D_{50}$ equal to or less than 16.0 μm, more preferably a particle size $D_{90}$ equal to or less than 25.0 μm and a particle size $D_{50}$ equal to or less than 14.0 μm, more preferably a particle size $D_{90}$ equal to or less than 22.0 μm and a particle size $D_{50}$ equal to or less than 12.0 μm, more preferably a particle size $D_{90}$ equal to or less than 18.0 μm and a particle size $D_{50}$ equal to or less than 10.0 μm.

According to one embodiment of the composition (C) of the present invention, the particles of the micronized wax ($M_p$), as detailed above, have a particle size according to one of the following particle size distributions:

$D_{10} \leq 3.0$ μm and $D_{90} \leq 36.0$ μm and $D_{50} \leq 20.0$ μm;

preferably, $D_{10} \leq 3.0$ μm and $D_{90} \leq 32.0$ μm and $D_{50} \leq 18.0$ μm;

more preferably, $D_{10} \leq 3.0$ μm and $D_{90} \leq 29.0$ μm and $D_{50} \leq 16.0$ μm;

more preferably, $D_{10} \leq 3.0$ μm and $D_{90} \leq 25.0$ μm and $D_{50} \leq 14.0$ μm;

more preferably, $D_{10} \leq 3.0$ μm and $D_{90} \leq 22.0$ μm and $D_{50} \leq 12.0$ μm;

more preferably, $D_{10} \leq 3.0$ μm and $D_{90} \leq 18.0$ μm and $D_{50} \leq 10.0$ μm.

According to the present invention, a particle size of the micronized wax ($M_p$), as detailed above, expressed as $D_{xx} \leq Y$ denotes a percentage (xx %) by weight of particles of the micronized wax ($M_p$) having a particle size equal to or less than Y.

For example, $D_{90} \leq 32.0$ μm denotes that 90 wt. % of the particles of the micronized wax ($M_p$), as detailed above, has a particle size equal to or less than 32.0 μm.

According to the present invention, the particle size of the particles of the micronized wax ($M_p$) is measured according to DIN ISO 13320.

According to one embodiment of the composition (C) according to the present invention, the particle size distribution of the particles of the micronized wax ($M_p$), as detailed above, is characterized by a span value (SV) from 1.00 to 3.00, preferably from 1.00 to 2.50, preferably from 1.00 to 2.00.

Within the context of the present invention, the span value (SV) is defined as follows:

$$SV = \frac{(D_{90} - D_{10})}{D_{50}}$$

The span value (SV) characterizes the breadth of a particle size distribution. A small SV means that the particle size distribution is narrow, while a large SV means that the particle size distribution is broad.

The inventors have found that when the particle size distribution of the particles of the micronized wax ($M_p$), as detailed above, is narrow (small SV), the resulting composition (C), as detailed above, yields a further improved spreadability upon its application to wood products. Furthermore, when the particle size distribution of the particles of the micronized wax ($M_p$), as detailed above, is narrow (small SV), improved abrasion resistance, scratch resistance, and slip resistance properties are also obtained.

It is further understood that all definitions and preferences as described for the micronized wax ($M_p$) above equally apply for this embodiment and all further embodiments, as described below.

It is further understood that the micronized wax ($M_p$) as comprised in the composition (C) of the present invention, as detailed above, is selected in such a way that the requirements for the micronized wax ($M_p$) in terms of its particle size, as detailed above, are complied with. Therefore, depending on the end application of the composition (C), suitable micronized waxes ($M_p$) may belong to various classes as long as they comply with the requirements of having the correct particle sizes.

The micronized wax ($M_p$) may be commercially available or may be prepared. Said preparation of the micronized wax ($M_p$) may be carried out using conventional methods known to the skilled in the art such as melt dispersion techniques, spraying techniques such as spray chilling, milling techniques such as air jet milling, precipitation techniques, grinding techniques, or bead polymerization.

As said above, the synthetic micronized wax ($M_p$), as detailed above, is selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof.

In one embodiment of the composition (C) according to the present invention, the synthetic micronized wax ($M_p$), as detailed above, has a needle penetration value P of equal to or less than 5.0 dmm (0.1 mm), preferably equal to or less than 4.0 dmm, more preferably equal to or less than 3.0 dmm, more preferably equal to or less than 2.0 dmm, more preferably equal to or less than 1.0 dmm.

According to the present invention, the needle penetration value P of the synthetic micronized wax ($M_p$), as detailed above, is measured according to DIN 51579 at 25° C.

Within the context of the present invention, the term "micronized polyethylene wax" is also intended to refer to micronized non-polar polyethylene wax and micronized oxidized high-density polyethylene wax.

Within the context of the present invention, the term "micronized polypropylene wax" is also intended to refer to micronized non-polar polypropylene wax.

Within the context of the present invention, the term "polyamide wax" is also intended to refer to micronized ethylene-bis-stearamide wax, micronized erucamide wax, micronized stearamide wax, and micronized amide wax made of sugar cane.

As non-limiting examples of suitable micronized polymer hybrids, mention may be also made of micronized hybrid wax of Fischer-Tropsch wax polytetrafluoroethylene wax and silica, micronized hybrid wax of Fischer-Tropsch wax and polyethylene wax, micronized hybrid wax of polyethylene wax and amide wax, micronized hybrid wax of Fischer-Tropsch wax and amide wax, micronized hybrid wax of polyethylene wax polypropylene wax Fischer-Tropsch wax and amide wax.

Preferred micronized waxes ($M_p$) having the required particle size properties, as detailed above, are chosen among micronized hybrid wax of polyethylene-polytetrafluoroethylene wax, micronized Fischer-Tropsch wax, micronized polyethylene wax, micronized polypropylene wax, or micronized polymer hybrids thereof.

More preferred micronized waxes ($M_p$) having the required particle size properties, as detailed above, are chosen among micronized Fischer-Tropsch wax, micronized polyethylene wax, micronized polypropylene wax, or micronized polymer hybrids thereof.

According to certain embodiments of the composition (C), as detailed above, micronized waxes ($M_p$) are chosen among micronized hybrid wax of polyethylene-polytetrafluoroethylene wax, micronized Fischer-Tropsch wax, micronized polyethylene wax, micronized polypropylene wax, or micronized polymer hybrids thereof, while having a needle penetration value P of equal to or less than 3.0 dmm, preferably equal to or less than 2.0 dmm, more preferably equal to or less than 1.0 dmm.

According to more preferred embodiments of the composition (C), as detailed above, micronized waxes ($M_p$) are chosen among micronized Fischer-Tropsch wax, micronized polyethylene wax, micronized polypropylene wax, or micronized polymer hybrids thereof, while having a needle penetration value P of equal to or less than 3.0 dmm, preferably equal to or less than 2.0 dmm, more preferably equal to or less than 1.0 dmm.

According to certain embodiments of the composition (C), as detailed above, micronized waxes ($M_p$) are chosen among micronized hybrid wax of polyethylene-polytetrafluoroethylene wax, micronized Fischer-Tropsch wax, micronized polyethylene wax, micronized polypropylene wax, or micronized polymer hybrids thereof, while having a particle size $D_{90}$ equal to or less than 18.0 μm and a particle size $D_{50}$ equal to or less than 10.0 μm.

According to more preferred embodiments of the composition (C), as detailed above, micronized waxes ($M_p$) are chosen among micronized Fischer-Tropsch wax, micronized polyethylene wax, micronized polypropylene wax, or micronized polymer hybrids thereof, while having a particle size $D_{90}$ equal to or less than 18.0 μm and a particle size $D_{50}$ equal to or less than 10.0 μm.

According to certain embodiments of the composition (C), as detailed above, micronized waxes ($M_p$) are chosen among micronized hybrid wax of polyethylene-polytetrafluoroethylene wax, micronized Fischer-Tropsch wax, micronized polyethylene wax, micronized polypropylene wax, or micronized polymer hybrids thereof, while having a particle size $D_{90}$ equal to or less than 18.0 μm and a particle size $D_{50}$ equal to or less than 10.0 μm, and while having a needle penetration value P of equal to or less than 3.0 dmm, preferably equal to or less than 2.0 dmm, more preferably equal to or less than 1.0 dmm.

According to more preferred embodiments of the composition (C), as detailed above, micronized waxes ($M_p$) are chosen among micronized Fischer-Tropsch wax, micronized polyethylene wax, micronized polypropylene wax, or micronized polymer hybrids thereof, while having a particle size $D_{90}$ equal to or less than 18.0 μm and a particle size $D_{50}$ equal to or less than 10.0 μm, and while having a needle penetration value P of equal to or less than 3.0 dmm, preferably equal to or less than 2.0 dmm, more preferably equal to or less than 1.0 dmm.

As said above, the amount of the micronized wax ($M_p$), as detailed above, is from 5.00 to 34.00 wt. %, relative to the total weight of the composition (C).

Within the context of the present invention, the expression "from 5.00 to 34.00 wt. % of the micronized wax ($M_p$)" refers either to the amount of micronized wax ($M_p$), when the composition (C) contains only one micronized wax ($M_p$), or to the sum of the amounts of micronized wax ($M_p$), when the composition (C) contains more than one micronized wax ($M_p$). This being said, it means that it is necessary that, when more than one micronized wax ($M_p$) is present, then it is the sum of the amounts of each of said micronized wax ($M_p$) that ranges from 5.00 to 34.00 wt. %, relative to the total weight of the composition (C).

Advantageously, the amount of the micronized wax ($M_p$), as detailed above, relative to the total weight of the composition (C), is equal to or greater than 8.00 wt. %, or equal to or greater than 10.00 wt. %.

It is further understood that the upper limit of the amount of the micronized wax ($M_p$), as detailed above, relative to the total weight of the composition (C), is equal to or less than 30.00 wt. %, preferably equal to or less than 25.00 wt. %, preferably equal to or less than 20.00 wt. %, preferably equal to or less than 18.00 wt. %, preferably equal to or less than 16.00 wt. %.

In a preferred embodiment of the composition (C) of the present invention, the micronized wax ($M_p$), as detailed above, relative to the total weight of the composition (C), is present in an amount from 5.00 to 25.00 wt. %, preferably in an amount from 8.00 to 20.00 wt. %, preferably in an amount from 8.00 to 18.00 wt. %, preferably in an amount from 10.00 to 16.00 wt. %.

According to certain embodiments of the present invention, the composition (C), as detailed above, may further comprise at least one pigment to enhance the appearance of the composition (C).

Within the context of the present invention, the expression "at least one pigment" is intended to denote one or more than one pigment. Mixtures of pigments can also be used for the purpose of the invention. In the remainder of the text, the expression "pigment" is understood, for the purposes of the present invention, both in the plural and the singular form.

Said pigments are known to those skilled in the art of wood coating compositions. Non-limiting examples of suitable pigments notably include: inorganic and organic pigments. As non-limiting examples of suitable inorganic pigments mention may be made of compounds of metals such as iron, zinc, titanium, lead, chromium, copper, cadmium, calcium, zirconium, cobalt, magnesium, aluminum, nickel, and other transition metals. Generally, some non-limiting examples of suitable inorganic pigments include iron oxides, including red iron oxides, yellow iron oxides, black iron oxides and brown iron oxides; carbon black, iron hydroxide, graphite, black micaceous iron oxide, aluminum flake pigments, pearlescent pigments; calcium carbonate; calcium phosphate; calcium oxide; calcium hydroxide; bismuth oxide; bismuth hydroxide; bismuth carbonate; copper carbonate; copper hydroxide; basic copper carbonate; silicon oxide; zinc carbonate; barium carbonate; barium hydroxide; strontium carbonate; zinc oxide; zinc phosphate; zinc chromate; barium chromate; chrome oxide, titanium dioxide, zinc sulfide, antimony oxide, or mixtures of two or more thereof. As non-limiting examples of suitable organic pigments mention may be made of monoazo (arylide) pigments such as PY3, PY65, PY73, PY74, PY97 and PY98; disazo (diarylide); disazo condensation; benzimidazolone; beta naphthol; naphthol: metal-organic complexes; isoindoline and isoindolinone; quinacridone; perylene; perinone; anthraquinone; diketopyrrolopyrrole; dioxazine; triacrylcarbonium; the phthalocyanine pigments, such as cobalt phthalocyanine, copper phthalocyanine, copper semichloro- or monochlorophthalocyanine, copper phthalocyanine, metal-free phthalocyanine, copper polychlorophthalocyanine, etc.; organic azo-compounds; organic nitro-compounds; polycyclic compounds such as phthalocyanine pigments, quinacridone pigments, perylene and perinone pigments; diketopyrrolopyrrole (DPP) pigments; thioindigo pigments; dioxazine pigments; quinophthalone pigments; triacrylcarbonium pigments, diaryl pyrrolopyroles, or mixtures of two or more thereof.

As to the amount of the pigments, it is understood that the skilled person in the art will practice said pigments in a suitable amount according to standard and general practice known by said skilled person in the art.

Generally, the amount of the pigments, as detailed above, when present, is from 0.05 wt. % to 30.00 wt. %, or from 1.00 wt. % to 25.00 wt. %, or from 2.50 to 20.00 wt. %, or from 5.00 to 17.50 wt. %, or from 7.50 to 15.00 wt. %, relative to the total weight of the composition (C).

According to certain embodiments of the present invention, the composition (C), as detailed above, may further comprise at least one other additional ingredient [ingredient ($I_C$), herein after] to enhance the appearance, storage, transport, handling and/or performance of the composition (C).

Within the context of the present invention, the expression "at least one other additional ingredients [ingredient ($I_C$), herein after]" is intended to denote one or more than one ingredient ($I_C$). Mixtures of ingredients ($I_C$) can also be used for the purpose of the invention. In the remainder of the text, the expression "ingredient ($I_C$)" is understood, for the purposes of the present invention, both in the plural and the singular form.

Said ingredients ($I_C$) are known to those skilled in the art of wood coating compositions. Non-limiting examples of ingredients ($I_C$) notably include: fire retardants, drying agents, surfactants, UV stabilizers, moisture scavengers, dispersants, biocides such as pesticides, herbicides, insecticides, weedicides, miticides, fungicides, moldicides, algaecides, acaricides, nematicides, bactericides, rodenticides, wetting agents, plasticizers, antifoaming agents, defoaming agents, oxygen scavengers, flowing agents, fragrances, or mixtures of two or more thereof.

As non-limiting examples, suitable surfactants notably include anionic surfactants, nonionic surfactants, cationic surfactants, amphiphilic surfactants, or mixtures of two or more thereof. Preferably, the surfactant is selected from anionic surfactant, nonionic surfactants, or mixtures of two or more thereof.

As non-limiting examples, suitable drying agents notably include naphthenates, tallates, decanoates, dodecanoates, neodecanoates, octoates of cobalt, manganese, lead, zirconium, calcium, barium, zinc, cerium, cerium/lanthanum, iron, neodymium, bismuth, vanadium, or mixtures of two or more thereof. Alternatively, also non-conventional drying agents may be used such as aluminium alkoxides. Furthermore, complex amines such as 1,10-phenanthrolene and 2,2-dipyridyl may be added as synergists to the drying agents.

As to the amount of the ingredients $(I_C)$, it is understood that the skilled person in the art will practice said additional ingredients $(I_C)$ in a suitable amount according to standard and general practice known by said skilled person in the art.

Generally, the amount of the ingredients $(I_C)$, as detailed above, when present, is from 0.05 wt. % to 20.00 wt. %, or from 0.10 wt. % to 15.00 wt. %, or from 0.10 wt. % to 10.00 wt. %, or from 0.10 wt. % to 5.00 wt. %, relative to the total weight of the composition (C).

According to a preferred embodiment of the present invention, the composition (C), as detailed above, comprises, relative to the total weight of the composition (C):

from 70.00 to 90.00 wt. % of at least one drying oil chosen among linseed oil, sunflower oil, tung oil, safflower oil, soybean oil, poppy seed oil, tall oil, peanut oil, (dehydrated) castor oil, corn oil, rapeseed oil, sesame seed oil, rice germ oil, cottonseed oil, fish oil, herring oil, grape seed oil, flaxseed oil, chia oil, oiticica oil, walnut oil, camelina oil, hemp seed oil, or perilla oil;

from 0.20 to 3.00 wt. % of at least one microcrystalline wax $(W_c)$ having a congealing point from 75° C. to 92° C.;

from 8.00 to 18.00 wt. % of at least one micronized wax $(M_p)$ selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one micronized wax $(M_p)$ having a particle size $D_{90}$ equal to or less than 22.0 μm and a particle size $D_{50}$ equal to or less than 12.0 μm;

optionally at least one pigment;

optionally at least one ingredient $(I_C)$;

wherein the congealing point of the at least one microcrystalline wax $(W_c)$ is measured according to the standard ASTM D938, and wherein the particle size of the at least one micronized wax $(M_p)$ is measured according to the standard DIN ISO 13320.

According to a more preferred embodiment of the present invention, the composition (C), as detailed above, consists essentially of, relative to the total weight of the composition (C):

from 70.00 to 90.00 wt. % of at least one drying oil chosen among linseed oil, sunflower oil, tung oil, soybean oil, poppy seed oil, tall oil, walnut oil, hemp seed oil, or perilla oil;

from 0.25 to 2.00 wt. % of at least one microcrystalline wax $(W_c)$ having a congealing point from 80° C. to 90° C.;

from 8.00 to 18.00 wt. % of at least one micronized wax $(M_p)$ chosen among micronized hybrid wax of polyethylene-polytetrafluoroethylene wax, micronized Fischer-Tropsch wax, micronized polyethylene wax, micronized polypropylene wax, or micronized polymer hybrids thereof, having a particle size $D_{90}$ equal to or less than 18.0 μm and a particle size $D_{50}$ equal to or less than 10.0 μm;

from 0.00 wt. % to 30.00 wt. % of at least one pigment;

from 0.10 wt. % to 10.00 wt. % of at least one ingredient $(I_C)$;

wherein the congealing point of the at least one microcrystalline wax $(W_c)$ is measured according to the standard ASTM D938, and wherein the particle size of the at least one micronized wax $(M_p)$ is measured according to the standard DIN ISO 13320.

According to a most preferred embodiment of the present invention, the composition (C), as detailed above, consists essentially of, relative to the total weight of the composition (C):

from 70.00 to 90.00 wt. % of at least one drying oil chosen among linseed oil, sunflower oil, tung oil, soybean oil, poppy seed oil, tall oil, walnut oil, hemp seed oil, or perilla oil;

from 0.25 to 2.00 wt. % of at least one microcrystalline wax $(W_c)$ having a congealing point from 80° C. to 90° C.;

from 10.00 to 16.00 wt. % of at least one micronized wax $(M_p)$ chosen among micronized Fischer-Tropsch wax, micronized polyethylene wax, micronized polypropylene wax, or micronized polymer hybrids thereof, having a particle size $D_{90}$ equal to or less than 18.0 μm and a particle size $D_{50}$ equal to or less than 10.0 μm;

from 0.00 wt. % to 30.00 wt. % of at least one pigment;

from 0.10 wt. % to 10.00 wt. % of at least one ingredient $(I_C)$;

wherein the congealing point of the at least one microcrystalline wax $(W_c)$ is measured according to the standard ASTM D938, and wherein the particle size of the at least one micronized wax $(M_p)$ is measured according to the standard DIN ISO 13320.

For the purpose of the present invention, the expression "consists essentially of" is intended to denote that any additional ingredient different from the at least one drying oil chosen among linseed oil, sunflower oil, tung oil, soybean oil, poppy seed oil, tall oil, walnut oil, hemp seed oil, or perilla oil, the at least one microcrystalline wax $(W_c)$ having a congealing point from 80° C. to 90° C., the at least one micronized wax $(M_p)$ chosen among micronized hybrid wax of polyethylene-polytetrafluoroethylene wax, micronized Fischer-Tropsch wax, micronized polyethylene wax, micronized polypropylene wax, or micronized polymer hybrids thereof, having a particle size $D_{90}$ equal to or less than 18.0 μm and a particle size $D_{50}$ equal to or less than 10.0 μm, the at least one pigment, and the at least one ingredient $(I_C)$, is present in minor amounts in said composition (C), being understood that these latter do not substantially modify the properties of said composition (C).

According to certain embodiments of the present invention, the composition (C), as detailed above, has a viscosity, as measured at 20° C. by using a Brookfield viscometer DV-E with spindle 3 at a rotation speed of 30 rpm, equal to or less than 1100 mPa·s at 20° C., preferably equal to or less than 900 mPa·s, preferably equal to or less than 700 mPa·s, preferably equal to or less than 600 mPa·s, preferably equal to or less than 500 mPa·s.

It is further understood that the composition (C), as detailed above, has advantageously a viscosity, as measured at 20° C. by using a Brookfield viscometer DV-E with spindle 3 at a rotation speed of 30 rpm, equal to or greater than 200 mPa·s at 20° C., preferably equal to or greater than 240 mPa·s, preferably equal to or greater than 260 mPa·s, preferably equal to or greater than 280 mPa·s, preferably equal to or greater than 300 mPa·s.

In a preferred embodiment of the present invention, the composition (C), as detailed above, has a viscosity, as measured at 20° C. by using a Brookfield viscometer DV-E with spindle 3 at a rotation speed of 30 rpm, from 200 to 1100 mPa·s at 20° C., preferably from 240 to 900 mPa·s, preferably from 260 to 700 mPa·s, preferably from 280 to 600 mPa·s, preferably from 300 to 500 mPa·s.

According to the present invention, the viscosity of the composition (C), as detailed above, is measured at 20° C. by using a Brookfield viscometer DV-E with spindle 3 at a rotation speed of 30 rpm.

Another aspect of the present invention is a method for the manufacturing of the composition (C), as detailed above.

It is further understood that all definitions and preferences, as described above, equally apply for all further embodiments, as described below.

The composition (C) of the present invention can be manufactured by a variety of methods known in the art. For manufacturing composition (C) of the present invention, several methods known in the art may adequately be used.

In one embodiment of the present invention, the method for the manufacturing of the composition (C), as detailed above, comprises intimate admixing of the alkyd resin or the drying oil, as detailed above, the microcrystalline wax ($W_c$), as detailed above, the micronized wax ($M_p$), as detailed above, optionally the at least one pigment, as detailed above, and optionally the at least one additional ingredient ($I_C$), as detailed above, with the proviso that the intimate admixing of the microcrystalline wax ($W_c$) is carried out at a temperature equal to or greater than the congealing point of said microcrystalline wax ($W_c$) in order to ensure and achieve its effective and homogeneous melting into the alkyd resin or into the drying oil as comprised in the composition (C), and further with the proviso that the intimate admixing of the micronized wax ($M_p$) is carried out at a temperature lower than the melting point of said micronized wax ($M_p$) in order to maintain or preserve its micronized form when being uniformly and homogeneously dispersed within the composition (C). It goes without saying that the use and presence of micronized waxes ($M_p$), i.e. in its micronized form, in the composition (C) according to the present invention has a decisive influence with regards to said composition (C) having good abrasion resistance, scratch resistance, matting, antiblocking, water repellency, and slip resistance properties, as demonstrated in the experimental section.

Upon intimate admixing of the microcrystalline wax ($W_c$), as detailed above, at a temperature equal to or greater than the congealing point of said microcrystalline wax ($W_c$), said microcrystalline wax is homogeneously melted and solubilized into the alkyd resin or into the drying oil as comprised in the composition (C). During the cooling of the obtained solution, the homogeneously melted and solubilized microcrystalline wax ($W_c$) at least partially crystallizes, thereby forming a (turbid) suspension, said (turbid) suspension giving rise to the desired rheological properties of the composition (C) leading to an excellent spreadability and an improved stability of the composition (C) against phase separation over time.

In a preferred embodiment of the present invention, the method for the manufacturing of the composition (C), as detailed above, comprises the steps of intimate admixing:

from 58.00 to 95.00 wt. % of at least one alkyd resin or at least one drying oil, as detailed above;

from 0.10 to 8.00 wt. % of at least one microcrystalline wax having a congealing point from 60° C. to 100° C. [microcrystalline wax ($W_c$), herein after];

from 5.00 to 34.00 wt. % of at least one synthetic micronized wax selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one synthetic micronized wax having a particle size $D_{90}$ equal to or less than 36.0 μm and a particle size $D_{50}$ equal to or less than 20.0 μm [micronized wax ($M_p$), herein after];

optionally at least one pigment, as detailed above;

optionally at least one ingredient ($I_C$), as detailed above;

wherein all wt. % are relative to the total weight of the composition (C), wherein the congealing point of the at least one microcrystalline wax ($W_c$) is measured according to the standard ASTM D938, wherein the particle size of the at least one micronized wax ($M_p$) is measured according to the standard DIN ISO 13320, wherein the intimate admixing of the microcrystalline wax ($W_c$) is carried out at a temperature equal to or greater than the congealing point of said microcrystalline wax ($W_c$), and wherein the intimate admixing of the micronized wax ($M_p$) is carried out at a temperature lower than the melting point of said micronized wax ($M_p$).

Generally said intimate admixing, as detailed above, may be carried out by using traditional mixers and blenders, high intensity mixers and electric stirrers, said mixers, blenders and stirrers which can be equipped with at least one dispersion disk.

Non-limiting examples of high intensity mixers notably include those high intensity mixers as commercially available from Dispermill, and from ROSS Mixers.

Non-limiting examples of dispersion disks notably include those dispersion disks as commercially available from Dispermill.

It is understood that the skilled person in the art will carry out said intimate admixing according to general practice such as notably using optimal times, speeds, weights, volumes and batch quantities.

Furthermore, it is understood that any order of intimate admixing of the various components as comprised in the composition (C), as detailed above, is acceptable.

If desired, the microcrystalline wax ($W_c$), as detailed above, can first be mixed in at least part of the alkyd resin or the drying oil, as detailed above, thereby forming a first premix, said first premix is then further mixed with the micronized wax ($M_p$), as detailed above, optionally the at least one pigment, as detailed above, optionally the ingredient ($I_C$), as detailed above, and optionally the remaining part of the alkyd resin or the drying oil. Alternatively, the micronized wax ($M_p$) can also be first uniformly and homogeneously dispersed in at least another part of the alkyd resin or the drying oil thereby forming a second premix, prior to be mixed with the first premix, as detailed above, optionally the at least one pigment, and optionally the ingredient ($I_C$), and optionally the remaining part of the alkyd resin or the drying oil.

It is further understood that the intimate admixing of the microcrystalline wax ($W_c$), as detailed above, in at least part of the alkyd resin or the drying oil, as detailed above, to obtain the first premix, as detailed above, is carried out at a temperature equal to or greater than the congealing point of said microcrystalline wax ($W_c$), and further the intimate admixing of the micronized wax ($M_p$) in said first premix, as detailed above, said micronized wax ($M_p$) optionally being present in the second premix, as detailed above, optionally the at least one pigment, as detailed above, optionally the ingredient ($I_C$), as detailed above, and optionally the remaining part of the alkyd resin or the drying oil, is carried out at a temperature lower than the melting point of the micronized wax ($M_p$). By way of example, the intimate admixing of the microcrystalline wax ($W_c$) in at least part of the alkyd resin or the drying oil to obtain the first premix is advantageously carried out at a temperature from 60° C. to 100° C., and further the intimate admixing of the micronized wax ($M_p$) in said first premix, said micronized wax ($M_p$) optionally being present in the second premix, optionally the at least one pigment, optionally the ingredient ($I_C$), and optionally the remaining part of the alkyd resin or the drying oil, is advantageously carried out at a temperature from 20° C. to 50° C.

Another aspect of the present invention is a method for treating a surface or at least part of a surface of a wood product wherein said wood product is treated with the composition (C), as detailed above.

It is further understood that all definitions and preferences, as described above, equally apply for all further embodiments, as described below.

As non-limiting examples of suitable wood products mention may be made of decking, siding, siding cladding, roof shingles, furniture, veneer, flooring, wood-based composite panels such as particle board (PB), hardboard, plywood, oriented strand board (OSB), flake board, chipboard and fibreboard such as medium density fibreboard (MDF), and high density fibreboard (HDF).

In general, the method for treating the surface or at least part of the surface of the wood product is not limited to wood products made of a particular type of wood.

Non-limiting examples of suitable types of wood notably include i. hardwood such as woods from dicotyledonous trees such as ash, mahogany, troko, beech, oak, maple, birch, walnut, teak, alder, aspen, elm, gum, poplar or willow, ii. softwood such as woods from coniferous trees such as larch, pine, fir, Douglas fir, hemlock, redwood, or spruce, or iii. certain other lignocellulosic materials such as bamboo, or hemp.

As non-limiting examples, suitable hardwood floorings notably include solid hardwood flooring such as solid parquet, or engineered hardwood flooring such as engineered parquet.

Preferred wood products are chosen among solid hardwood flooring, or engineered hardwood flooring.

Among the suitable manners for applying the composition (C), as detailed above, to the surface or at least part of the surface of the wood products, as detailed above, mention can be notably made of conventional application methods known to those skilled in the art of wood coating compositions such as painting, spraying such as air-atomized spraying, air-assisted spraying and airless spraying, flow-coating, transfer-coating, roller coating, brushing, impregnating, dipping, spreading, curtain coating, and the like by using conventional equipment such as but not limited to a sprayer, a roller coating machine, a cloth, a brush, a polishing machine with pads, and the like. Preferably, the composition (C) is applied to the surface or at least part of the surface of the wood products by spreading using a polishing machine with pads, or by roller coating using a roller coating machine.

In general, after applying the composition (C), as detailed above, to the surface or at least part of the surface of the wood products, as detailed above, the applied composition (C) is then finally polished during at least one polishing step. The at least one polishing step can for instance be performed manually, for example by using a cloth, or by using a polishing machine with pads. In case of any excess of the applied composition (C) is present on the surface or at least part of the surface of the wood products, said excess should be removed within an appropriate timeframe during at least one removal step. The at least one removal can for instance be performed manually, for example by using a cloth, or by using a polishing machine with pads.

If desired, prior to application of the composition (C), as detailed above, the surface or at least part of the surface of the wood products is preliminary roughened up, such as by mechanical abrasion.

As already mentioned above, due to the excellent spreadability of the composition (C), as detailed above, said composition (C) can be applied to the surface or at least part of the surface of wood products in low amounts, for instance in an amount from 8.0 gram per square meter [$g/m^2$, herein after] to 40.0 $g/m^2$, preferably from 8.5 $g/m^2$ to 30.0 $g/m^2$, preferably from 9.0 to 22.5 $g/m^2$, preferably from 10.0 $g/m^2$ to 15.0 $g/m^2$, thereby resulting in thin coating layers, for instance with an average thickness from 8.0 to 40.0 micron, preferably from 8.5 to 30.0 micron, preferably from 9.0 to 22.5 micron, preferably from 10.0 to 15.0 micron.

Furthermore, in the present invention, the inventors have surprisingly found that the composition (C), as detailed above, can be applied to the surface or at least part of the surface of wood products in one single layer while maintaining good hardness, abrasion resistance, scratch resistance, matting, antiblocking, water repellency, and slip resistance properties.

Another aspect of the present invention is a coated layer obtained by the method for treating the surface or at least part of the surface of the wood product, as detailed above, wherein said wood product is treated with the composition (C), as detailed above.

It is further understood that all definitions and preferences, as described above, equally apply for all further embodiments, as described below.

As already mentioned above, due to the excellent spreadability of the composition (C), as detailed above, the application of the composition (C) to the surface or at least part of the surface of wood products can result in thin coating layers, for instance coating layers with an average thickness from 8.0 to 40.0 micron, preferably from 8.5 to 30.0 micron, preferably from 9.0 to 22.5 micron, preferably from 10.0 to 15.0 micron.

In general, the coated layer, as detailed above, is preferably characterized by an average thickness equal to or less than 50.0 micron. The inventors have found that coated layers having a too high average thickness, for instance an average thickness exceeding 50.0 micron, can result in inferior properties of said coated layer since in these particular cases the micronized wax ($M_p$) may be at least partially hindered to ensure good abrasion resistance, scratch resistance, matting, antiblocking, water repellency, and slip resistance properties to said coated layer comprising the composition (C), as detailed above. In the experimental section of the present application, for instance with regards to the gloss level measurements, slip resistance measurements, resistance to liquids, and scrub resistance measurements, the compositions (C) were applied to oak boards in an amount of 15 $g/m^2$, thereby resulting in coated layers with an average thickness equal to approximately 15 micron.

Another aspect of the present invention is a use of the composition (C), as detailed above, in the method for treating the surface or at least part of the surface of the wood product, as detailed above.

It is further understood that all definitions and preferences, as described above, equally apply for all further embodiments, as described below.

If desired, prior to application to the surface or at least part of the surface of the wood products, as detailed above, the composition (C), as detailed above, can be first mixed with at least one accelerator to further enhance the drying properties of said composition (C), meaning that the time for drying the composition (C) is now significantly reduced while maintaining good hardness, abrasion resistance, scratch resistance, matting, antiblocking, water repellency, and slip resistance properties.

Within the context of the present invention, the expression "at least one accelerator" is intended to denote one or more than one accelerator. Mixtures of accelerators can also be used for the purpose of the invention. In the remainder of the text, the expression "accelerator" is understood, for the purposes of the present invention, both in the plural and the singular form.

In general, said accelerators are known to those skilled in the art of wood coating compositions. As a non-limiting example of a suitable accelerator mention may be made of isocyanate-based accelerators which are known to those skilled in the art of wood coating compositions. As non-limiting examples of suitable isocyanate-based accelerators mention may be made of aromatic, aliphatic, and cycloaliphatic polyisocyanates. Non-limiting examples of aromatic polyisocyanates notably include 2,4-tolylene diisocyanate, 2,6-tolylene diisocyanate, xylylene diisocyanate, tetramethylxylene diisocyanate, triphenylmethane triisocyanate, 4,4'-methylenebis(phenyl isocyanate), 1,3-phenylene diisocyanate, 2,4,4'-diphenyl ether triisocyanate, 1,5-naphthalene diisocyanate, or oligomers or mixtures of two or more thereof. Non-limiting examples of aliphatic polyisocyanates notably include hexamethylene diisocyanate, or oligomers thereof. Non-limiting examples of cycloaliphatic polyisocyanates notably include isophorone diisocyanate, dicyclohexylmethane 4,4'-diisocyanate, 1,4-cyclohexylene diisocyanate, or oligomers or mixtures of two or more thereof.

As to the amount of the accelerator, as detailed above, the accelerator is mixed with the composition (C), as detailed above, in a weight ratio of the composition (C) to the accelerator from 15:1 to 1:1, preferably from 10:1 to 1:1, more preferably from 5:1 to 1:1.

The reference numbers used in the experimental part, as described and detailed below, in particular with reference to the analytical test method for measuring the slip resistance of the compositions (C), relate to the annexed drawings, wherein:

FIG. 1. is a measurement setup for measuring the slip resistance under a static force. In particular, the distance X is systematically increased up to the point where a block 2 begins to slide on an oak board 1, whereby the oak board 1 has been treated with the composition (C) according to the present invention, and as detailed above. Consequently, the distance X is thus a measure of the slip resistance of the composition (C).

FIG. 2, and FIG. 3. are measurement setups for measuring the slip resistance under a dynamic force. With reference to said measurement setups of FIG. 2, and FIG. 3, a pendulum block 3 starting from two different angular distances is swung against a block 2 on an oak board 1, whereby the oak board 1 has been treated with the composition (C) according to the present invention, and as detailed above. Consequently, the distance X is thus a measure of the slip resistance of the composition (C).

FIG. 4. shows the measurement results regarding the stability of Examples 6 and 11 according to the present invention and Comparative Example 9 against phase separation via visual observations (as measured after a period of 25 days at 20° C.).

EXAMPLES

The invention will be now described in more details with reference to the following examples, whose purpose is merely illustrative and not intended to limit the scope of the invention. All mixing ratios, contents and concentrations in this text are given in units of weight and percent by weight unless otherwise stated.

General Analytical Test Methods

Stability Against Phase Separation
i. Via Rheology Measurements:

The stability against phase separation was measured by an oscillatory rheological measurement applying a sinusoidal voltage distortion in order to examine the viscoelastic properties of the compositions (C) according to the present invention, as detailed above, at rest. The resulting numerical values regarding the known rheological parameters of storage modulus G' (Pa) and loss modulus G" (Pa) were determined, respectively. The Modular Compact Rheometer MCR 302 was used originating from the company Anton Paar Gmbh (Austria), operated with the RheoCompass software, equipped with a plate-plate trigonometry, and using a PP50/P2 spindle. The compositions (C) were loaded on the fixed stationary lower peltier plate of the rheometer and the spindle measuring head was lowered to a gap of 0.5 mm (i.e. the distance between the lower peltier plate and the spindle measuring head). The Modular Compact Rheometer MCR 302 was calibrated according to the manufacturer's procedure before starting measurements or between measurements when the upper spindle measurement head was removed for cleaning. The compositions (C) were free of visible impurities or air bubbles and were conditioned at room temperature prior to any measurement (22±1° C.).
Measurement Parameters:
    method=amplitude sweep;
    temperature=20° C.;
    angular velocity $\omega$=10 rad·s$^{-1}$;
    strain=from 0.01 to 100%; and
    number of data points=60, logarithmically distributed.
ii. Via Visual Observations:

Closed transparent containers made of plastic were each individually filled with equal amounts of the compositions (C), as detailed above. Subsequently, the respective containers were left untouched for a period of 25 days at 20° C. After those 25 days at 20° C., these containers were visually compared with the naked eye and precisely evaluated regarding their stability against phase separation.
Spreadability With regards to the evaluation of the spreadability (i.e. the lubricity or the polishability) of the compositions (C) according to the present invention, as detailed above, viscosity measurements (expressed in mPa·s (cP)) at high shear forces were performed at 20° C. using the Modular Compact Rheometer MCR 302 originating from the company Anton Paar Gmbh (Austria), operated with the RheoCompass software, equipped with a plate-plate trigonometry, and using a PP50/P2 spindle. The compositions (C) were loaded on the fixed stationary lower peltier plate of the rheometer and the spindle measuring head was lowered to a gap of 0.15 mm (i.e. the distance between the lower peltier plate and the spindle measuring head). The Modular Compact Rheometer MCR 302 was calibrated according to the manufacturer's procedure before starting measurements or when the upper spindle measurement head was removed for cleaning between measurements. The compositions (C) were free of visible impurities or air bubbles and were conditioned at room temperature prior to any measurement (22±1° C.).
Measurement Parameters:
    temperature=20° C.; and shear rate=10000 s$^{-1}$.

Antiblocking Properties

The measurements regarding the antiblocking properties of the compositions (C) according to the present invention, as detailed above, were performed according to the standard ASTM D$_{2793}$-99 (2017) whereby the following method and measurement parameters were additionally taken into account:

the compositions (C) were applied using a spongy pad to one side of oak boards;

the compositions (C) were mixed beforehand respectively with a polyisocyanate accelerator at a weight ratio of 3:1;

size oak boards=5 cm×19 cm;

finish grade of oak boards=sanded with sandpaper characterized by a grain size increasing from 60 to 120 until a scratch-free surface was obtained. The wooden surface was then thoroughly cleaned with a vacuum cleaner to remove any dust residues;

±0.12-0.14 g of the composition (C) on a wet basis was applied to the oak board (size=5 cm×19 cm). This event was verified by weighing the particular oak board by using a standard scale with a reading accuracy of 0.01 g;

drying time before the oak boards were stacked and pushed together per series of 6 oak boards=15 minutes;

after this drying time, a series of 6 oak boards were stacked from bottom to top as follows: one oak board with its side with composition (C) facing up, two oak boards with their respective sides with composition (C) facing down, one oak board with its side with composition (C) facing up, two oak boards with their respective sides with composition (C) facing down. In this way, a stacking is provided with two face-to-face contacts and two face-to-back contacts;

pressure on the oak boards=170000 Pa;

temperature=22° C.;

relative humidity=50%; and time duration=24 hours.

Gloss Level Measurements

The gloss level measurements of the compositions (C) according to the present invention, as detailed above, were performed according to the ASTM D523 standard and using the ZGM 1130 Zehnter-Glossmeter 20°, 60°, 85° and reflection haze H. The following method and measurement parameters were additionally taken into account:

the compositions (C) were applied using a spongy pad to one side of oak boards;

the compositions (C) were mixed beforehand respectively with a polyisocyanate accelerator at a weight ratio of 3:1;

size oak boards=5 cm×19 cm;

finish grade of oak boards=sanded with sandpaper characterized by a grain size increasing from 60 to 120 until a scratch-free surface was obtained. The wooden surface was then thoroughly cleaned with a vacuum cleaner to remove any dust residues;

layer thickness composition (C) on a dry basis=15 g per m$^2$. This event was verified by weighing the particular oak board by using a standard scale with a reading accuracy of 0.01 g;

temperature=22° C.;

gloss meter geometry=60° incoming light rays; and measurement of the gloss level (expressed in gloss units, i.e. gloss units GU) at reflected light rays at 85°.

Slip Resistance

The slip resistance of the compositions (C) according to the present invention, as detailed above, was measured in accordance with the measurement setups as illustrated in FIGS. 1-3, respectively. The slip resistance under a static force was measured in accordance with the measurement setup of FIG. 1. The slip resistance under a dynamic force was measured according to the measurement setups of FIGS. 2-3.

With reference to the measurement setups as illustrated respectively in FIGS. 1-3, the following method and measurement parameters were additionally taken into account:

the compositions (C) were applied using a spongy pad to one side of oak boards;

the compositions (C) were mixed beforehand respectively with a polyisocyanate accelerator at a weight ratio of 3:1;

size oak board 1=5 cm×46.6 cm;

mass of block 2=253.00 g;

mass of pendulum block 3=745.54 g;

finish grade of oak boards=sanded with sandpaper characterized by a grain size increasing from 60 to 120 until a scratch-free surface was obtained. The wooden surface was then thoroughly cleaned with a vacuum cleaner to remove any dust residues;

layer thickness composition (C) on a dry basis=15 g per m$^2$. This event was verified by weighing the particular oak board by using a standard scale with a reading accuracy of 0.01 g; and temperature=22° C.

With concern to the measurement setup of FIG. 1, the distance X was systematically increased up to the point where the block 2 began to slide on the oak board 1, said oak board 1 being coated with the composition (C). Consequently, the distance X is thus a measure of the slip resistance of the respective composition (C).

With concern to the measurement setups of FIGS. 2-3, the pendulum block 3 starting from two different angular distances was swung against the block 2 on the oak board 1, said oak board 1 being coated with the composition (C). Consequently, the distance X is thus a measure of the slip resistance of the respective composition (C).

Resistance to Liquids

The measurements regarding the resistance of the compositions (C) according to the present invention, as detailed above, to liquids were performed according to the standard BS EN 12720: 2009+A1: 2013. The following method and measurement parameters were additionally taken into account:

the compositions (C) were applied using a spongy pad to one side of oak boards;

the compositions (C) were mixed beforehand respectively with a polyisocyanate accelerator at a weight ratio of 3:1;

size oak boards=5 cm×19 cm;

finish grade of oak boards=sanded with sandpaper characterized by a grain size increasing from 60 to 120 until a scratch-free surface was obtained. The wooden surface was then thoroughly cleaned with a vacuum cleaner to remove any dust residues;

tested liquids=water and cola;

1 h and 4 h after application of one of the liquids to the oak boards, being coated with the composition (C), said oak boards were studied for any staining in a color assessment cabinet BGD 276 equipped with a lamp TL84;

regarding the 4 h samples, the applied liquids were shielded from the surroundings immediately after application using a petri dish;

layer thickness composition (C) on a dry basis=15 g per m². This event was verified by weighing the particular oak board by using a standard scale with a reading accuracy of 0.01 g;

temperature=22.7° C.; and relative humidity=56.3%.

Scrub Resistance (Abrasion Resistance)

The measurements regarding the scrub resistance of the compositions (C) according to the present invention, as detailed above, were performed according to the standard ASTM $D_{2486}$-17 and using the BGD 526 Wet Abrasion Scrub Tester. The following method and measurement parameters were additionally taken into account:

the compositions (C) were applied using a spongy pad to one side of oak boards;

the compositions (C) were mixed beforehand respectively with a polyisocyanate accelerator at a weight ratio of 3:1;

size oak boards=5 cm×19 cm;

finish grade of oak boards=sanded with sandpaper characterized by a grain size increasing from 60 to 120 until a scratch-free surface was obtained. The wooden surface was then thoroughly cleaned with a vacuum cleaner to remove any dust residues;

mass brush=459 g;

demineralized water was used instead of an abrasive scrub agent;

length of the bristles of the brush=1.8 cm (the end and the beginning of the bristles were marked so as to ensure that scrubbing was always performed in the same direction);

the brushes were thoroughly cleaned with water and soaked in water before the start of the scrub test, furthermore between each scrub test the brushes were cleaned with water;

layer thickness composition (C) on a dry basis=15 g per m². This event was verified by weighing the particular oak board by using a standard scale with a reading accuracy of 0.01 g;

10 ml of water was applied per oak board to the scrubbed course;

for each scrub test, the bristles of the brush were already wetted with water before starting the scrub test;

temperature=22° C.; and

37±1 scrub cycles per minute.

The oak boards, said oak boards being coated with the respective compositions (C) according to the present invention, as detailed above, were scrubbed at their centers for a series of 400 scrub cycles (as set on the BGD 526 Wet Abrasion Scrub Tester). This series of 400 scrub cycles was repeated until wear was noticed on the respective oak board being coated with the respective compositions (C). The number of series of 400 scrub cycles is thus a measure of the scrub resistance of the respective compositions (C).

TABLE 1

| components used in the compositions of the Examples and in the compositions of the Comparative Examples | | |
|---|---|---|
| | Company | Description |
| Drying oil | | |
| linseed oil | — | raw (untreated) |
| soybean oil | — | raw (untreated) |
| Microcrystalline wax ($W_c$) | | |
| microcrystalline wax ($W_c$) - 60° C. | Alpha Wax | congealing point[1]: 60° C. |
| microcrystalline wax ($W_c$) - 86° C. | Alpha Wax | congealing point[1]: 86° C. |
| Synthetic micronized wax ($M_p$) | | |
| Ceretan ME0825 | Munzing | surface-modified polyethylene wax[2]; $D_{90} < 28$ μm and $D_{50} < 8$ μm |
| Ceretan MX9510 | Munzing | polyolefin wax[2]; $D_{90} < 10$ μm and $D_{50} < 4$ μm |
| Ceretan MPF 2520D | Munzing | polypropylene wax coated with PTFE[2]; $D_{90} < 20$ μm and $D_{50} < 10$ μm |
| Ceretan MX9825 | Munzing | polyolefin wax[2]; $D_{90} < 25$ μm and $D_{50} < 9$ μm |
| Ceretan MXF9899 | Munzing | polyolefin wax coated with PTFE[2]; $D_{50} < 50$ μm |
| Natural wax | | |
| beeswax | Prayon Benelux | bleached beeswax |
| Additional ingredients ($I_c$) | | |
| drying agent: Octa-Soligen ® Cobalt 12 HS | Borchers | cobalt octoate drying agent |
| Pigment | | |
| Embaplast 06-1101 | Sioen | pigment preparation based on titanium dioxide ($TiO_2$) |

TABLE 1-continued

| | components used in the compositions of the Examples and in the compositions of the Comparative Examples | |
| --- | --- | --- |
| | Company | Description |
| Accelerator | | |
| Poly(hexamethylene diisocyanate)[3] | — | CAS: 28182-81-2 |

[1]The congealing point of the microcrystalline wax ($W_c$) is measured according to the standard ASTM D938.
[2]The particle size of the micronized wax ($M_p$) is measured according to the standard DIN ISO 13320.
[3]If an accelerator is applied, the composition is respectively mixed with the accelerator in a weight ratio of 3:1.

General Procedure for Manufacturing Composition (C) According to the Present Invention:

Reference is hereby made to the above Table 1 with respect to the various components used in the compositions of the Examples and used in the compositions of the Comparative Examples. The exact compositions of the Examples and of the Comparative Examples, with respect to the type of components contained therein and the related quantities thereof, are described in Tables 2-9 below.

In a first step, a premix was made of a microcrystalline wax ($W_c$) in a portion of a drying oil. The mixture was heated under stirring until the microcrystalline wax ($W_c$) was melted in the portion of the drying oil (i.e. the mixture was heated to a temperature greater than the congealing point of said microcrystalline wax ($W_c$) in order to ensure and achieve its effective and homogeneous melting into the drying oil). Then, the mixture was cooled to room temperature in order to form the premix comprising said microcrystalline wax ($W_c$) in the portion of the drying oil as a turbid suspension.

In a second step, the aforementioned premix was further mixed with the remaining components of the compositions of the Examples and of the Comparative Examples, as listed in Tables 2-9 below. The whole mixture was mixed for 5 minutes at a temperature lower than the melting point of the micronized wax ($M_p$) (i.e. in order to maintain or preserve its micronized form in the obtained mixture) using a high intensity mixer, the mixer being equipped with a dispersion disk.

Influence of the Presence of the Microcrystalline Wax ($W_c$)

Examples 2-4 (Ex 2-4) and Examples 6-8 (Ex 6-8) according to the invention were manufactured according to the general procedure described above. The experimental results are shown below in Tables 2-4.

The Comparative Example 1 (CEx 1) and the Comparative Example 5 (CEx 5) do not contain any microcrystalline wax ($W_c$). These Comparative Examples were manufactured by mixing the respective components of the composition, as described in Table 2 below for the Comparative Example 1 and Table 3 for the Comparative Example 5, for 5 minutes at a temperature lower than the melting point of the micronized wax ($M_p$) (i.e. in order to maintain or preserve its micronized form in the obtained mixture) using a high intensity mixer, the mixer being equipped with a dispersion disk. The experimental results are shown below in Tables 2-3.

TABLE 2

| | CEx 1 | Ex 2 | Ex 3 | Ex 4 |
| --- | --- | --- | --- | --- |
| influence of the amount of the microcrystalline wax ($W_c$) | | | | |
| | | | Amount (wt. %) | |
| Drying oil | | | | |
| linseed oil | 64.50 | 56.50 | 64.00 | 64.40 |
| Microcrystalline wax ($W_c$) | | | | |
| microcrystalline wax ($W_c$) congealing point: 60° C. | 0.00 | 8.00 | 0.50 | 0.10 |
| Micronized wax ($M_p$) | | | | |
| Ceretan ME0825 | 15.00 | 15.00 | 15.00 | 15.00 |
| Additional ingredients ($I_c$) | | | | |
| drying agent: Octa-Soligen ® Cobalt 12 HS | 0.50 | 0.50 | 0.50 | 0.50 |
| Pigment | | | | |
| Embaplast 06-1101 | 20.00 | 20.00 | 20.00 | 20.00 |
| Stability against phase separation via rheology measurements [strain = 0.03%] | | | | |
| G' (Pa) | 4.76 | 4029.10 | 89.17 | 30.64 |
| G" (Pa) | 5.89 | 2639.20 | 42.77 | 21.74 |
| G' – G" (Pa) | −1.13 | 1389.90 | 46.40 | 8.90 |
| Resistance to liquids | | | | |
| water[1] | 1 h: score 0 | 1 h: score 0 | 1 h: score 0 | 1 h: score 0 |
| | 4 h: score 0 | 4 h: score 0 | 4 h: score 0 | 4 h: score 0 |
| cola[1] | 1 h: score 0 | 1 h: score 0 | 1 h: score 0 | 1 h: score 0 |

TABLE 2-continued

| influence of the amount of the microcrystalline wax ($W_c$) | | | |
| --- | --- | --- | --- |
| CEx 1 | Ex 2 | Ex 3 | Ex 4 |
| | Amount (wt. %) | | |
| 4 h: score 0 | 4 h: score 0 | 4 h: score 0 | 4 h: score 0 |

[1]Score 0 = no stain visible; Score 1 = a stain visible but removable after surface care; Score 2 = a stain visible and not removable with surface care.

The experimental results as shown in Table 2 clearly demonstrate that the presence of the microcrystalline wax ($W_c$) in the compositions (C) according to the invention provides an increased stability of said compositions (C) against phase separation, in particular when compared to the compositions which do not contain any microcrystalline wax ($W_c$), and with further reference to the disclosed compositions of the working examples of US 2003/0154885 A1, US 2007/0037001 A1, EP 1217051 A2, and U.S. Pat. No. 4,857,578 A in absence of any microcrystalline wax ($W_c$) contained therein. As clearly defined above in the description of the present application, and as it is furthermore generally known in the art, a microcrystalline wax ($W_c$) refers to a specific type of wax that is derived from de-oiling petrolatum during the refining process of crude petroleum. When compared to paraffin waxes (which mainly contains unbranched alkanes) for instance as disclosed in the working examples of US 2007/0037001 A1, microcrystalline waxes ($W_c$) contain a significantly higher percentage of saturated isoparaffinic (branched) hydrocarbons, i.e. isoparaffins, and naphthenic hydrocarbons, thereby resulting in smaller, thinner, and more flexible crystal structures when compared to paraffin wax crystals.

An increased stability against phase separation is, via the rheology measurements as described above, characterized by a high storage modulus G' relative to the loss modulus G" and thus a positive value for the difference G'-G". Such increased (rheological) stability translates into a less rapid sagging as a function of time of the ($TiO_2$) pigment, the micronized wax ($M_p$), or any other additional components as dispersed in the compositions (C). More specifically, Examples 2-4 according to the present invention differ from the Comparative Example 1 only in that Examples 2-4 contain 8.00, 0.50, and 0.10 wt. % of a microcrystalline wax ($W_c$), respectively. The Comparative Example 1 does not contain any microcrystalline wax ($W_c$). The Comparative Example 1 is furthermore characterized by a negative value for the difference G'-G" (i.e. −1.13 Pa), while the Examples 2-4 are characterized by positive values for the said difference G'-G", these positive values increasing with an increasing amount of the microcrystalline wax ($W_c$) as contained in the respective compositions (C). Such higher values of the storage modulus G' relative to the loss modulus G" lead to an increased stability of the compositions (C) against phase separation.

The observed increased stability against phase separation, as described above based on the rheology measurements performed, was also and further confirmed via visual observations. After 25 days at 20° C., Examples 2-4 showed an increased stability against phase separation while a clearly larger and more significant phase separation was noticed in the case of the composition of the Comparative Example 1.

The viscosity measurements at high shear forces have demonstrated that, despite the presence of the microcrystalline wax ($W_c$) in the compositions (C) provides an increased stability of the said compositions (C) against phase separation, a too high amount of the microcrystalline wax ($W_c$) results in a less good spreadability (i.e. a less good lubricity or polishability) of said compositions (C). Example 2 contains 8.00 wt. % microcrystalline wax ($W_c$) and is characterized by a higher viscosity, measured at high shear strength, equal to 252 mPa·s when compared to the Comparative Example 1. The Comparative Example 1 does not contain any microcrystalline wax ($W_c$) and is characterized by a lower viscosity, measured at high shear force, equal to 107 mPa·s. In case of the presence of the microcrystalline wax ($W_c$) in amounts greater than 8.00 wt. %, the spreadability (i.e. the lubricity or the polishability) of the compositions, despite the obtained increased stability against phase separation, becomes less good.

In addition to the obtained improved and increased stability against phase separation, the other properties of Examples 2-4 according to the present invention are maintained, such as the resistance to liquids. Example 2 is further characterized, for example, by a gloss level equal to 4.1 GU leading to a good matting. Good matting is said to be obtained when the measurement of the gloss level (expressed in gloss units, i.e. gloss units GU) at reflected light rays at 85° is less than 10 GU. In addition, Example 2 is characterized, for example, by a good slip resistance as measured via the measurement setup of FIG. 1. More precisely, the X value of Example 2 via the measurement setup of FIG. 1 is equal to 308 mm which corresponds to excellent slip resistance (when X≤250 mm=low slip resistance; when 250 mm<X<300 mm=good slip resistance; when X≥300 mm=excellent slip resistance).

TABLE 3

| influence of the nature of the drying oil | | | |
| --- | --- | --- | --- |
| | CEx 5 | Ex 6 | Ex 7 |
| | | Amount (wt. %) | |
| Drying oil | | | |
| linseed oil | 0.00 | 64.00 | 0.00 |
| soybean oil | 64.50 | 0.00 | 64.00 |
| Microcrystalline wax ($W_c$) | | | |
| microcrystalline wax ($W_c$) congealing point: 86° C. | 0.00 | 0.50 | 0.50 |
| Micronized wax ($M_p$) | | | |
| Ceretan ME0825 | 15.00 | 15.00 | 15.00 |
| Additional ingredients ($I_c$) | | | |
| drying agent: Octa-Soligen ® Cobalt 12 HS | 0.50 | 0.50 | 0.50 |
| Pigment | | | |
| Embaplast 06-1101 | 20.00 | 20.00 | 20.00 |
| Stability against phase separation via rheology measurements [strain = 0.03%] | | | |

TABLE 3-continued

| influence of the nature of the drying oil | | | |
| --- | --- | --- | --- |
| | CEx 5 | Ex 6 | Ex 7 |
| | | Amount (wt. %) | |
| G' (Pa) | 4.76 | 10.38 | 27.60 |
| G" (Pa) | 7.71 | 9.16 | 15.64 |
| G' – G" (Pa) | −2.95 | 1.22 | 11.96 |
| | | Gloss level[1] | |
| gloss level (gloss units GU)[2] | nd | 7.7 | 9.1 |
| | | Resistance to liquids | |
| water[3] | 1 h: score 0 | 1 h: score 0 | 1 h: score 0 |
| | 4 h: score 0 | 4 h: score 0 | 4 h: score 0 |
| cola[3] | 1 h: score 0 | 1 h: score 0 | 1 h: score 0 |
| | 4 h: score 0 | 4 h: score 0 | 4 h: score 0 |
| | | Scrub resistance (abrasion resistance) | |
| number of series of 400 scrub cycles to wear | nd | 6 | 6 |

[1]Good matting is said to be obtained when the measurement of the gloss level (expressed in gloss units, i.e. gloss units GU) at reflected light rays at 85° is less than 10 GU.
[2]The experimental values reported are the average values after five experiments.
[3]Score 0 = no stain visible; Score 1 = a stain visible but removable after surface care; Score 2 = a stain visible and not removable with surface care.

The experimental results as shown in Table 3 clearly demonstrate that the linseed oil as the drying oil, as described in Table 2 for Examples 2-4 according to the present invention, can be successfully substituted by a soybean oil as the drying oil while maintaining the same technical effects such as, for example, good stability against phase separation, matting, resistance to liquids, and scrub resistance. More specifically, Examples 6-7 according to the present invention, as described in Table 3, only differ from each other in that the linseed oil as the drying oil for Example 6 was now completely substituted in Example 7 by an equal amount of a soybean oil as the drying oil.

Both Examples 6-7 according to the present invention are characterized by a positive value for the difference G'-G". Such higher values of the storage modulus G' relative to the loss modulus G" lead to an increased stability of the Examples 6-7 against phase separation. The Comparative Example 5, based on soybean oil as the drying oil, does not contain any microcrystalline wax (W_c). The Comparative Example 5 is characterized by a negative value for the difference G'-G" (i.e. −2.95 Pa) while Examples 6-7 are characterized by positive values for the said difference G'-G". This observed increased stability against phase separation, as demonstrated and evidenced based on the rheology measurements performed, was also further confirmed via visual observations. After 25 days at 20° C., Examples 6-7 showed an increased stability against phase separation while a clearly larger and more significant phase separation was noticed in the case of the compositions in the absence of the microcrystalline wax (W_c).

The remaining experiments as shown in Table 3 demonstrate that, in addition to the obtained good stability against phase separation, the other technical properties of the Examples 6-7 according to the present invention, such as in particular matting, resistance to liquids, and scrub resistance, are maintained. As described above, good matting is said to be obtained when the measurement of the gloss level (expressed in gloss units, i.e. gloss units GU) at reflected light rays at 85° is less than 10 GU.

TABLE 4

| influence of the nature of the microcrystalline wax (W_c) | | |
| --- | --- | --- |
| | Ex 7 | Ex 8 |
| | Amount (wt. %) | |
| Drying oil | | |
| linseed oil | 0.00 | 0.00 |
| soybean oil | 64.00 | 63.00 |
| Microcrystalline wax (W_c) | | |
| microcrystalline wax (W_c) congealing point: 60° C. | 0.00 | 1.50 |
| microcrystalline wax (W_c) congealing point: 86° C. | 0.50 | 0.00 |
| Micronized wax (M_p) | | |
| Ceretan ME0825 | 15.00 | 15.00 |
| Additional ingredients (I_c) | | |
| drying agent: Octa-Soligen ® Cobalt 12 HS | 0.50 | 0.50 |
| Pigment | | |
| Embaplast 06-1101 | 20.00 | 20.00 |
| Stability against phase separation via rheology measurements [strain = 0.03%] | | |
| G' (Pa) | 27.60 | 65.98 |
| G" (Pa) | 15.64 | 37.00 |
| G' – G" (Pa) | 11.96 | 28.98 |

The experimental results shown in Table 4 clearly demonstrate that for both cases concerning the presence of a microcrystalline wax (W_c) with a congealing point of 60° C. on the one hand as well as a microcrystalline wax (W_c) with a congealing point of 86° C. on the other hand provides good stability against phase separation, whereby the congealing point of the microcrystalline wax (W_c) is measured according to the standard ASTM D938. For example, Examples 7-8 according to the present invention differ only in that Example 7 contains 0.50 wt. % of a microcrystalline wax (W_c) having a congealing point of 86° C., while Example 8 contains 1.50 wt. % of a microcrystalline wax (W_c) having a congealing point of 60° C. Both Examples 7-8 according to the present invention are characterized by a positive value for the difference G'-G" (i.e. 11.96 Pa and 28.98 Pa, respectively). Such higher values of the storage modulus G' relative to the loss modulus G" lead to an increased stability of the compositions (C) against phase separation.

The observed increased stability against phase separation, as described above based on the rheology measurements performed, was also confirmed via visual observations. After 25 days at 20° C., Examples 7-8 showed an increased stability against phase separation.

Influence of the Presence of the Micronized Wax (M_p)

Examples 10-11 and 13-15 (Ex 10-11 and 13-15) according to the present invention were manufactured according to the general procedure described above. The experimental results are shown below in Tables 5-8.

The Comparative Examples 9, 12, and 16 (CEx 9, 12, and 16) do not contain any micronized wax (M_p). The Comparative Example 12 contains a natural beeswax and the Comparative Example 16 contains a synthetic micronized polyolefin wax coated with PTFE and whereby D_{50}<50 μm as measured according to the standard DIN ISO 13320. The Comparative Examples 12 and 16 were manufactured in the same way as for the Examples 10-11 and 13-15 according to the present invention. The Comparative Example 9 was manufactured by mixing the respective components of the composition, as shown in Table 5, for 5 minutes using a high intensity mixer, the mixer being equipped with a dispersion disk. The experimental results are shown below in Tables 5-8.

an improved stability to the compositions (C) against phase separation with respect to the sagging of the more heavy pigments such as $TiO_2$ dispersed in said compositions (C).

The viscosity measurements at high shear forces have shown that a too high amount of the micronized wax ($M_p$) results in a less good spreadability (i.e. a less good lubricity

TABLE 5

| influence of the amount of the micronized wax ($M_p$) | | | | |
| --- | --- | --- | --- | --- |
| | CEx 9 | Ex 10 | Ex 6 | Ex 11 |
| | | Amount (wt. %) | | |
| Drying oil | | | | |
| linseed oil | 79.00 | 74.00 | 64.00 | 45.00 |
| Microcrystalline wax ($W_c$) | | | | |
| microcrystalline wax ($W_c$) congealing point: 86° C. | 0.50 | 0.50 | 0.50 | 0.50 |
| Micronized wax ($M_p$) | | | | |
| Ceretan ME0825 | 0.00 | 5.00 | 15.00 | 34.00 |
| Additional ingredients ($I_c$) | | | | |
| drying agent: Octa-Soligen ® Cobalt 12 HS | 0.50 | 0.50 | 0.50 | 0.50 |
| Pigment | | | | |
| Embaplast 06-1101 | 20.00 | 20.00 | 20.00 | 20.00 |
| | | Spreadability | | |
| Viscosity (mPa · s) | 70 | 71 | 113 | 392 |
| | | Gloss level[1] | | |
| gloss level (gloss units GU)[2] | 13.9 | 9.7 | 7.7 | 7.1 |
| | | Slip resistance | | |
| X (mm) measurement setup FIG. 2 (see [3]) | 128.3 | 102.5 | 113.3 | 91.7 |
| | | Resistance to liquids | | |
| water[4] | 1 h: score 0 | 1 h: score 0 | 1 h: score 0 | 1 h: score 0 |
| | 4 h: score 0 | 4 h: score 0 | 4 h: score 0 | 4 h: score 0 |
| cola[4] | 1 h: score 0 | 1 h: score 0 | 1 h: score 0 | 1 h: score 0 |
| | 4 h: score 0 | 4 h: score 0 | 4 h: score 0 | 4 h: score 0 |
| | | Scrub resistance | | |
| number of series of 400 scrub cycles to wear | 5 | 6 | 6 | 6 |

[1]Good matting is said to be obtained when the measurement of the gloss level (expressed in gloss units, i.e. gloss units GU) at reflected light rays at 85° is less than 10 GU.
[2]The experimental values reported are the average values after five experiments.
[3] When X ≥ 120 mm = low slip resistance; when X 100 mm < X < 120 mm = good slip resistance; when X ≤ 100 mm = excellent slip resistance.
[4]Score 0 = no stain visible; Score 1 = a stain visible but removable after surface care; Score 2 = a stain visible and not removable with surface care.

The stability against phase separation was investigated via visual observations. The influence of the presence of the microcrystalline wax ($W_c$) in the compositions (C) according to the present invention on the stability of said compositions (C) against phase separation has already been demonstrated and discussed above, in particular with reference to the experimental results as described in Tables 2-4. The inventors have now surprisingly found that, in addition to the presence of the microcrystalline wax ($W_c$), the presence of the micronized wax ($M_p$) also plays a role in the stability of the compositions (C) against phase separation, especially in particular in order to delay or prevent the sagging of the more heavy pigments such as $TiO_2$. More specifically, as shown in FIG. 4, the inventors have found that the presence of the micronized wax ($M_p$) in larger amounts, e.g. 15.00 wt. % for Example 6 and 34.00 wt. % for Example 11, provides or polishability) of the compositions. In case of the presence of the micronized wax ($M_p$) in amounts greater than 34.00 wt. %, the spreadability (i.e. the lubricity or the polishability) of the compositions, despite, among other things, the obtained increased stability against phase separation, becomes less good.

The Examples 10-11 and the Example 6 according to the present invention in the presence of the micronized wax ($M_p$) further demonstrate good matting in the gloss level measurements, whereby a minimal amount of 5.00 wt. % of the micronized wax ($M_p$) is necessary. Good matting is said to be obtained when the measurement of the gloss level (expressed in gloss units, i.e. gloss units GU) at reflected light rays at 85° is less than 10 GU. The Comparative Example 9 in the absence of any micronized wax ($M_p$) does not demonstrate sufficient matting when compared to the other compositions (C) in which the micronized wax ($M_p$) is present. Furthermore, with reference to the Examples 10-11 and the Example 6 according to the present invention, the inventors have found that for a same particle size and chemical nature of the micronized wax ($M_p$) an increasing concentration of said micronized wax ($M_p$) leads to enhanced matting.

Furthermore, the Examples 10-11 and the Example 6 according to the present invention in the presence of the micronized wax ($M_p$) demonstrate a good slip resistance under a dynamic force (with reference to the measurement setup of FIG. 2). The Comparative Example 9 in the absence of any micronized wax ($M_p$) is characterized by a less good slip resistance when compared to the other compositions (C) in which the micronized wax ($M_p$) is present. Furthermore, with reference to Examples 10-11 and the Example 6 according to the present invention, the inventors have found that for a same particle size and chemical nature of the micronized wax ($M_p$) an increasing concentration of said micronized wax ($M_p$) leads to improved slip resistance.

Furthermore, the Examples 10-11 and the Example 6 according to the present invention in the presence of the micronized wax ($M_p$) demonstrate good scrub resistance. The Comparative Example 9 in the absence of any micronized wax ($M_p$) has a less good scrub resistance when compared to the other compositions (C) in which the micronized wax ($M_p$) is present.

TABLE 6 influence of the amount of the micronized
wax ($M_p$) on the antiblocking properties

| | CEx 9 | Ex 6 |
|---|---|---|
| | Amount (wt. %) | |
| Drying oil | | |
| linseed oil | 79.00 | 64.00 |
| Microcrystalline wax ($W_c$) | | |
| microcrystalline wax ($W_c$) congealing point: 86° C. | 0.50 | 0.50 |
| Micronized wax ($M_p$) | | |
| Ceretan ME0825 | 0.00 | 15.00 |
| Additional ingredients ($I_c$) drying agent: Octa-Soligen ® Cobalt 12 HS | 0.50 | 0.50 |
| Pigment | | |
| Embaplast 06-1101 | 20.00 | 20.00 |

TABLE 6-continued influence of the amount of the micronized
wax ($M_p$) on the antiblocking properties

| | CEx 9 | Ex 6 |
|---|---|---|
| | Amount (wt. %) | |
| Antiblocking properties[1] | | |
| oak board 1 | E | D |
| oak board 2 | E | D |
| oak board 3 | E | B |
| oak board 4 | E | D |
| oak board 5 | E | D |
| oak board 6 | D | B |

[1]Degree of blocking: A = free fall separation; B = light tap to separate; C = light pressure to separate; D = moderate pressure to separate; E = extreme pressure to separate; F = tool required to separate.

The Example 6 according to the present invention, in the presence of 15.00 wt. % of the micronized wax ($M_p$), is characterized by good antiblocking properties. The Comparative Example 9, in the absence of any micronized wax ($M_p$), demonstrates significantly less good to no antiblocking properties when compared to the said Example 6. The observed differences in antiblocking properties for the Example 6 and the Comparative Example 9 are most significant for oak boards 3 and 6 (i.e. face-to-back contacts).

TABLE 7 influence of the nature of the micronized wax ($M_p$)

| | CEx 12 | Ex 13 | Ex 14 | Ex 6 | Ex 15 |
|---|---|---|---|---|---|
| | Amount (wt. %) | | | | |
| Drying oil | | | | | |
| linseed oil Microcrystalline wax ($W_c$) | 64.00 | 64.00 | 64.00 | 64.00 | 64.00 |
| microcrystalline wax ($W_c$) congealing point: 86° C. Micronized wax ($M_p$) | 0.50 | 0.50 | 0.50 | 0.50 | 0.50 |

TABLE 7-continued

| | CEx 12 | Ex 13 | Ex 14 | Ex 6 | Ex 15 |
|---|---|---|---|---|---|
| | | | influence of the nature of the micronized wax ($M_p$) | | |
| | | | Amount (wt. %) | | |
| beeswax | 15.00 | 0.00 | 0.00 | 0.00 | 0.00 |
| Ceretan MX9510 | 0.00 | 15.00 | 0.00 | 0.00 | 0.00 |
| Ceretan MPF 2520D | 0.00 | 0.00 | 15.00 | 0.00 | 0.00 |
| Ceretan ME0825 | 0.00 | 0.00 | 0.00 | 15.00 | 0.00 |
| Ceretan MX9825 | 0.00 | 0.00 | 0.00 | 0.00 | 15.00 |
| Additional ingredients ($I_c$) | | | | | |
| drying agent: Octa-Soligen ® Cobalt 12 HS Pigment | 0.50 | 0.50 | 0.50 | 0.50 | 0.50 |
| Embaplast 06-1101 | 20.00 | 20.00 | 20.00 | 20.00 | 20.00 |
| | | | Gloss level[1] | | |
| gloss level (gloss units GU)[2] | 13.2 | nd | 7.5 | 7.7 | 9.0 |
| | | | Slip resistance | | |
| X (mm) measurement setup FIG. 1 (score: see [3]) | 280 | 310 | 330 | 315 | 370 |
| | | | Resistance to liquids | | |
| water[4] | 1 h: score 0 | 1 h: score 0 | 1 h: score 0 | 1 h: score 0 | 1 h: score 0 |
| | 4 h: score 0 | 4 h: score 0 | 4 h: score 0 | 4 h: score 0 | 4 h: score 0 |
| cola[4] | 1 h: score 0 | 1 h: score 0 | 1 h: score 0 | 1 h: score 0 | 1 h: score 0 |
| | 4 h: score 0 | 4 h: score 0 | 4 h: score 0 | 4 h: score 0 | 4 h: score 0 |
| | | | Scrub resistance | | |
| number of series of 400 scrub cycles to wear | 4 | 7 | 6 | 6 | 6 |

[1]Good matting is said to be obtained when the measurement of the gloss level (expressed in gloss units, i.e. gloss units GU) at reflected light rays at 85° is less than 10 GU.
[2]The experimental values reported are the average values after five experiments.
[3] When X ≤ 250 mm = low slip resistance; when 250 mm < X < 300 mm = good slip resistance; when X ≥ 300 mm = excellent slip resistance.
[4]Score 0 = no stain visible; Score 1 = a stain visible but removable after surface care; Score 2 = a stain visible and not removable with surface care.

The experimental results as shown in Table 7 demonstrate that the Comparative Example 12 comprising 15.00 wt. % of a natural beeswax, said beeswax as for instance contained in the aqueous wood wax oils as described in CN 110330892 A as well, has an inferior matting, slip resistance under a static force (with reference to the measurement setup of FIG. 1), and scrub resistance when compared to the Examples 13-15 and Example 6 according to the present invention in which 15.00 wt. % of a specific synthetic micronized wax ($M_p$) is present. The aqueous wood wax oils as described in CN 110330892 A are prepared by melting and mixing the various components at high temperatures, i.e. temperatures above the melting point of the various components such as temperatures up to 180-200° C., so that in these aqueous wood wax oils no wax is present in micronized form. In particular, the experimental results shown in Table 7 demonstrate that in case of the Comparative Example 12, wear already occurred at four series of 400 scrub cycles, whereas in the Examples 13-15 and Example 6 according to the present invention, at least six series of 400 scrub cycles were required before any wear could be observed. This observation highlights and demonstrates the adverse impact of the beeswax as contained in Comparative Example 12 on the various properties as mentioned in the above Table 7, when compared to the beneficial impact of the specific synthetic micronized waxes ($M_p$) as contained in Examples 13-15 and Example 6 on said various properties.

TABLE 8

| | CEx 16 | Ex 14 | Ex 6 | Ex 15 |
|---|---|---|---|---|
| | | influence of the particle size of the micronized wax ($M_p$) | | |
| | | Amount (wt. %) | | |
| Drying oil | | | | |
| linseed oil | 64.00 | 64.00 | 64.00 | 64.00 |

TABLE 8-continued

| influence of the particle size of the micronized wax $(M_p)$ | | | | |
|---|---|---|---|---|
| | CEx 16 | Ex 14 | Ex 6 | Ex 15 |
| | | Amount (wt. %) | | |
| Microcrystalline wax $(W_c)$ | | | | |
| microcrystalline wax $(W_c)$ congealing point: 86° C. | 0.50 | 0.50 | 0.50 | 0.50 |
| Micronized wax $(M_p)$ | | | | |
| Ceretan MXF9899 | 15.00 | 0.00 | 0.00 | 0.00 |
| Ceretan MPF 2520D | 0.00 | 15.00 | 0.00 | 0.00 |
| Ceretan ME0825 | 0.00 | 0.00 | 15.00 | 0.00 |
| Ceretan MX9825 | 0.00 | 0.00 | 0.00 | 15.00 |
| Additional ingredients $(I_c)$ | | | | |
| drying agent: Octa-Soligen ® Cobalt 12 HS | 0.50 | 0.50 | 0.50 | 0.50 |
| Pigment | | | | |
| Embaplast 06-1101 | 20.00 | 20.00 | 20.00 | 20.00 |
| | | Gloss level[1] | | |
| gloss level (gloss units GU)[2] | 10.7 | 7.5 | 7.7 | 9.0 |
| | | Slip resistance | | |
| X (mm) measurement setup FIG. 2 (score: see [3]) | 123.3 | 106.7 | 113.3 | 78.3 |
| X (mm) measurement setup FIG. 3 (score: see [4]) | 210.0 | 186.7 | 194.3 | 198.3 |
| | | Resistance to liquids | | |
| water[5] | 1 h: score 0 | 1 h: score 0 | 1 h: score 0 | 1 h: score 0 |
| | 4 h: score 0 | 4 h: score 0 | 4 h: score 0 | 4 h: score 0 |
| cola[5] | 1 h: score 0 | 1 h: score 0 | 1 h: score 0 | 1 h: score 0 |
| | 4 h: score 0 | 4 h: score 0 | 4 h: score 0 | 4 h: score 0 |

[1]Good matting is said to be obtained when the measurement of the gloss level (expressed in gloss units, i.e. gloss units GU) at reflected light rays at 85° is less than 10 GU.
[2]The experimental values reported are the average values after five experiments.
[3] When X ≥ 120 mm = low slip resistance; when X 100 mm < X < 120 mm = good slip resistance; when X ≤ 100 mm = excellent slip resistance.
[4] When X ≥ 230 mm = low slip resistance; when X 200 mm < X < 230 mm = good slip resistance; when X ≤ 200 mm = excellent slip resistance.
[5]Score 0 = no stain visible; Score 1 = a stain visible but removable after surface care; Score 2 = a stain visible and not removable with surface care.

The experimental results as shown in Table 8 demonstrate that the compositions comprising a synthetic micronized wax $(M_p)$ having a too high particle size are characterized by poorer matting and slip resistance. In particular, the Comparative Example 16 (CEx 16) contains 15.00 wt. % of a synthetic micronized wax having a particle size $D_{50}$<50 μm. Moreover, the Comparative Example 16 leads to remarkably less good results in terms of matting and slip resistance when compared to the Examples 14-15 and Example 6 according to the invention in which 15.00 wt. % of a specific synthetic micronized wax $(M_p)$ is present. This observation highlights the importance of the particle size of the micronized wax $(M_p)$ for obtaining the good properties of the compositions (C) according to the present invention and as demonstrated by Examples 14-15 and Example 6 in Table 8.

The Examples 14-15 and the Example 6 according to the present invention in the presence of the micronized wax $(M_p)$ demonstrate good matting in the gloss level measurements. Good matting is said to be obtained when the measurement of the gloss level (expressed in gloss units, i.e. gloss units GU) at reflected light rays at 85° is less than 10 GU. The Comparative Example 16 in the presence of a synthetic micronized wax having a too high particle size (i.e. $D_{50}$<50 μm) does not demonstrate sufficient matting when compared to the Examples 14-15 and Example 6 in which the micronized wax $(M_p)$ is present.

Furthermore, the Examples 14-15 and the Example 6 according to the present invention in the presence of the micronized wax $(M_p)$ demonstrate good slip resistance under a dynamic force (with reference to the measurement setup of FIGS. 2-3). The Comparative Example 16 in the presence of a synthetic micronized wax having a too high particle size (i.e. $D_{50}$<50 μm) has a significantly lower slip resistance when compared to the Examples 14-15 and Example 6 in which the micronized wax ($M_p$) is present.

Influence of the Presence of the Microcrystalline Wax ($W_c$) and of the Micronized Wax ($M_p$)

The Comparative Example 17 (CEx 17) does not contain any microcrystalline wax ($W_c$) and does not contain any micronized wax ($M_p$). The Comparative Example 17 was prepared by mixing the respective constituents of the composition, as shown in Table 9, for 5 minutes using a high intensity mixer with the mixer equipped with a dispersion disk. The experimental results are shown below in Table 9.

TABLE 9

| influence of the presence of the microcrystalline wax ($W_c$) and of the micronized wax ($M_p$) | | |
|---|---|---|
| | CEx 17 | Ex 6 |
| | Amount (wt. %) | |
| Drying oil | | |
| linseed oil | 79.50 | 64.00 |
| Microcrystalline wax ($W_c$) | | |
| microcrystalline wax ($W_c$) congealing point: 86° C. | 0.00 | 0.50 |
| Micronized wax ($M_p$) | | |
| Ceretan ME0825 | 0.00 | 15.00 |
| Additional ingredients ($I_c$) | | |
| drying agent: Octa-Soligen ® Cobalt 12 HS | 0.50 | 0.50 |
| Pigment | | |
| Embaplast 06-1101 | 20.00 | 20.00 |
| Spreadability | | |
| Viscosity (mPa · s) | 55 | 113 |
| Gloss level[1] | | |
| gloss level (gloss units GU)[2] | 10.1 | 7.7 |
| Slip resistance | | |
| X (mm) measurement setup FIG. 1 (see [3]) | 275 | 315 |
| X (mm) measurement setup FIG. 2 (see [4]) | 133.3 | 113.3 |
| X (mm) measurement setup FIG. 3 (see [5]) | 208.3 | 194.3 |
| Resistance to liquids | | |
| water[6] | 1 h: score 0 | 1 h: score 0 |
| | 4 h: score 0 | 4 h: score 0 |
| cola[6] | 1 h: score 0 | 1 h: score 0 |
| | 4 h: score 0 | 4 h: score 0 |
| Scrub resistance | | |
| number of series of 400 scrub cycles to wear | 5 | 6 |

[1] Good matting is said to be obtained when the measurement of the gloss level (expressed in gloss units, i.e. gloss units GU) at reflected light rays at 85° is less than 10 GU.
[2] The experimental values reported are the average values after five experiments.
[3] When X ≤ 250 mm = low slip resistance; when 250 mm < X < 300 mm = good slip resistance; when X ≥ 300 mm = excellent slip resistance.
[4] When X ≥ 120 mm = low slip resistance; when X 100 mm < X < 120 mm = good slip resistance; when X ≤ 100 mm = excellent slip resistance.
[5] When X ≥ 230 mm = low slip resistance; when X 200 mm < X < 230 mm = good slip resistance; when X ≤ 200 mm = excellent slip resistance.
[6] Score 0 = no stain visible; Score 1 = a stain visible but removable after surface care; Score 2 = a stain visible and not removable with surface care.

The stability against phase separation was investigated via visual observations. In contrast to Example 6, as already discussed above, the Comparative Example 17, in the absence of any microcrystalline wax ($W_c$) and any micronized wax ($M_p$), shows clear and significant phase separation after 25 days at 20° C.

Furthermore, based on the experimental results shown in Table 9, the Comparative Example 17 does not demonstrate sufficient matting in the gloss level measurements (gloss value equal to 10.1). Good matting is said to be obtained when the measurement of the gloss level (expressed in gloss units, i.e. gloss units GU) at reflected light rays at 85° is less than 10 GU. The Example 6 according to the present invention has a gloss level equal to 7.7.

Furthermore, the Comparative Example 17 convincingly demonstrates a lower slip resistance when compared to Example 6 according to the present invention (with reference to the measurement setups of FIGS. 1-3).

The Comparative Example 17 further demonstrates a less good scrub resistance when compared to Example 6 in which both of the microcrystalline wax ($W_c$) and the micronized wax ($M_p$) are present. The experimental results as shown in Table 9 demonstrate that for the Comparative Example 17, wear already occurred at five series of 400 scrub cycles, whereas for Example 6 according to the present invention, six series of 400 scrub cycles were required before wear could be observed.

The invention claimed is:

1. A wood coating composition comprising, relative to the total weight of the composition (C):
   from 58.00 to 95.00 weight percentage of at least one alkyd resin or at least one drying oil;
   from 0.10 to 8.00 wt. % of at least one microcrystalline wax derived from de-oiling petrolatum during the refining process of crude petroleum and having a congealing point from 60° C. to 100° C.;
   from 5.00 to 34.00 wt. % of at least one synthetic micronized wax selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one synthetic micronized wax having a particle size $D_{90}$ equal to or less than 36.0 μm and a particle size $D_{50}$ equal to or less than 20.0 μm [micronized wax ($M_p$), herein after];
   wherein the congealing point of the microcrystalline wax ($W_c$) is measured according to the standard ASTM D938, and wherein the particle size of the at least one micronized wax ($M_p$) is measured according to the standard DIN ISO 13320.

2. The composition (C) according to claim 1, wherein the composition (C) comprises from 58.00 to 95.00 wt. %, relative to the total weight of the composition (C), of the at least one drying oil, and wherein the at least one drying oil is selected from the group consisting of linseed oil, sunflower oil, tung oil, safflower oil, soybean oil, poppy seed oil, tall oil, peanut oil, (dehydrated) castor oil, corn oil, rapeseed oil, sesame seed oil, rice germ oil, cottonseed oil, fish oil, herring oil, grape seed oil, flaxseed oil, chia oil, oiticica oil, menhaden oil, walnut oil, camelina oil, hemp seed oil, and perilla oil.

3. The composition (C) according to claim 1, wherein the at least one drying oil, relative to the total weight of the composition (C), is present in an amount from 65.00 to 92.00 wt. %.

4. The composition (C) according to claim 1, wherein the at least one drying oil, relative to the total weight of the composition (C), is present in an amount from 70.00 to 90.00 wt. %.

5. The composition (C) according to claim 1, wherein the microcrystalline wax ($W_c$) has a congealing point from 75° C. to 92° C.

6. The composition (C) according to claim 1, wherein the microcrystalline wax ($W_c$), relative to the total weight of the composition (C), is present in an amount from 0.15 to 6.00 wt. %.

7. The composition (C) according to claim 1, wherein the microcrystalline wax ($W_c$), relative to the total weight of the composition (C), is present in an amount from 0.15 to 5.00 wt. %.

8. The composition (C) according to claim 1, wherein the microcrystalline wax ($W_c$), relative to the total weight of the composition (C), is present in an amount from 0.20 to 4.00 wt. %.

9. The composition (C) according to claim 1, wherein the microcrystalline wax ($W_c$), relative to the total weight of the composition (C), is present in an amount from 0.20 to 3.00 wt. %.

10. The composition (C) according to claim 1, wherein the microcrystalline wax ($W_c$), relative to the total weight of the composition (C), is present in an amount from 0.25 to 2.00 wt. %.

11. The composition (C) according to claim 1, wherein the micronized wax ($M_p$) has a particle size $D_{90}$ equal to or less than 25.0 μm and a particle size $D_{50}$ equal to or less than 14.0 μm.

12. The composition (C) according to claim 1, wherein the micronized wax ($M_p$) has a particle size distribution:

$D_{10} \leq 3.0$ μm and $D_{90} \leq 25.0$ μm and $D_{50} \leq 14.0$ μm.

13. The composition (C) according to claim 1, wherein the micronized wax ($M_p$) is selected from the group consisting of polyethylene-polytetrafluoroethylene wax, micronized Fischer-Tropsch wax, micronized polyethylene wax, and micronized polypropylene wax, and micronized polymer hybrids thereof.

14. The composition (C) according to claim 1, wherein the micronized wax ($M_p$), relative to the total weight of the composition (C), is present in an amount from 5.00 to 25.00 wt. %.

15. A method for the manufacturing of the composition (C), according to claim 1, wherein the method comprises the steps of intimate admixing:

from 58.00 to 95.00 wt. % of at least one alkyd resin or at least one drying oil;

from 0.10 to 8.00 wt. % of at least one microcrystalline wax derived from de-oiling petrolatum during the refining process of crude petroleum and having a congealing point from 60° C. to 100° C.;

from 5.00 to 34.00 wt. % of at least one synthetic micronized wax selected from the group consisting of micronized polytetrafluoroethylene wax, micronized hybrid wax of polyethylene-polytetrafluoroethylene wax, micronized Fischer-Tropsch wax, micronized polyethylene wax, micronized polypropylene wax, micronized polyamide wax, and micronized polymer hybrids thereof, said at least one synthetic micronized wax having a particle size $D_{90}$ equal to or less than 36.0 μm and a particle size $D_{50}$ equal to or less than 20.0 μm; wherein all wt. % are relative to the total weight of the composition (C), wherein the congealing point of the microcrystalline wax ($W_c$) is measured according to the standard ASTM D938, wherein the particle size of the micronized wax ($M_p$) is measured according to the standard DIN ISO 13320, wherein the intimate admixing of the microcrystalline wax ($W_c$) is carried out at a temperature equal to or greater than the congealing point of said microcrystalline wax ($W_c$), and wherein the intimate admixing of the micronized wax ($M_p$) is carried out at a temperature lower than the melting point of said micronized wax ($M_p$).

16. The method according to claim 15, wherein the microcrystalline wax ($W_c$) is first mixed in at least part of the at least one alkyd resin or the at least one drying oil thereby forming a first premix, whereby said first premix is then further mixed with the micronized wax ($M_p$), optionally said micronized ($M_p$) wax being first dispersed in at least another part of the at least one alkyd resin or the at least one drying oil thereby forming a second premix, and optionally the remaining part of the at least one alkyd resin or the at least one drying oil.

17. A method for treating a surface or at least part of a surface of a wood product wherein said wood product is treated with the composition (C), according to claim 1, and wherein the composition (C) is applied to the surface of at least part of the surface of the wood product by painting, spraying such as air-atomized spraying, air-assisted spraying and airless spraying, flow-coating, transfer-coating, roller coating, brushing, impregnating, dipping, spreading, curtain coating.

18. The method according to claim 17, wherein the wood product is selected from the group consisting of decking, siding, siding cladding, roof shingles, furniture, veneer, flooring, particle board (PB), hardboard, plywood, oriented strand board (OSB), flake board, chipboard, fibreboard, medium density fibreboard (MDF), and high density fibreboard (HDF).

19. The method according to claim 17, wherein the composition (C) is applied to the surface or at least part of the surface of the wood product in an amount from 8.0 gram per square meter to 40.0 g/m².

20. The method according to claim 17, wherein, prior to application, the composition (C) is first mixed with at least one accelerator.

21. The method according to claim 20, wherein the at least one accelerator comprises at least one isocyanate-based accelerator.

* * * * *